(12) United States Patent
Zoppas et al.

(10) Patent No.: US 8,057,728 B2
(45) Date of Patent: *Nov. 15, 2011

(54) DEVICE AND PROCESS FOR EXTRACTING PLASTIC ITEMS

(75) Inventors: Matteo Zoppas, Conegliano (IT); Massimo Coran, Spresiano (IT); Jader Pavanetto, Mestre (IT)

(73) Assignee: S.I.P.A. Societa Industrializzazione Progettazione e Automazione S.p.A. (IT)

(*) Notice: Subject to any disclaimer, the term of this patent is extended or adjusted under 35 U.S.C. 154(b) by 1035 days.

This patent is subject to a terminal disclaimer.

(21) Appl. No.: 10/574,889

(22) PCT Filed: Oct. 5, 2004

(86) PCT No.: PCT/EP2004/052440
§ 371 (c)(1),
(2), (4) Date: Apr. 7, 2006

(87) PCT Pub. No.: WO2005/037520
PCT Pub. Date: Apr. 28, 2005

(65) Prior Publication Data
US 2008/0014295 A1   Jan. 17, 2008

(30) Foreign Application Priority Data

Oct. 7, 2003  (IT) .................. RM2003A0459

(51) Int. Cl.
*B29C 45/40* (2006.01)
*B29C 45/72* (2006.01)

(52) U.S. Cl. ............... 264/334; 264/297.8; 425/444; 425/576

(58) Field of Classification Search ............ 425/534, 425/556, 540, 576, 436 RM; 264/334, 297.3, 264/297.8
See application file for complete search history.

(56) References Cited

U.S. PATENT DOCUMENTS

| | | | | |
|---|---|---|---|---|
| 4,140,464 A | * | 2/1979 | Spurr et al. | 425/533 |
| 4,786,455 A | * | 11/1988 | Krishnakumar et al. | 264/237 |
| 5,653,934 A | * | 8/1997 | Brun et al. | 264/334 |
| 6,391,244 B1 | | 5/2002 | Chen | 264/336 |
| 6,520,765 B2 | * | 2/2003 | van Manen et al. | 425/547 |
| 6,652,262 B2 | * | 11/2003 | Kroeger | 425/556 |
| 2003/0003187 A1 | | 1/2003 | Coran et al. | 425/547 |
| 2004/0115302 A1 | * | 6/2004 | Rommes et al. | 425/526 |

FOREIGN PATENT DOCUMENTS
EP   1 106 324 A1   12/2000

* cited by examiner

*Primary Examiner* — Yogendra N Gupta
*Assistant Examiner* — Emmanuel S Luk
(74) *Attorney, Agent, or Firm* — Lorusso & Associates

(57) ABSTRACT

A device and process for extracting plastic preforms (5) from holders. Said device comprises a plate (23), which features straight slits (26) positioned parallel to each other, that is attached to a supporting table (20, 21). Each slit (26) comprises wider sections and constrictions (29, 30), which have a width (L2) smaller than the diameter of the ring (9) of the preform, so that the ring (9) can be fitted into the slit (26) through the wider section. The plate (23) is moved in the direction <<D>> by a specific length until the constrictions are positioned under the ring, and, thus, the preforms are removed by moving the plate away from the holders.

9 Claims, 22 Drawing Sheets

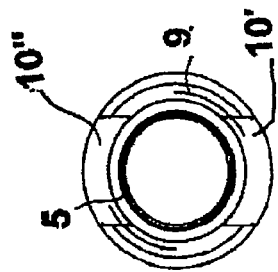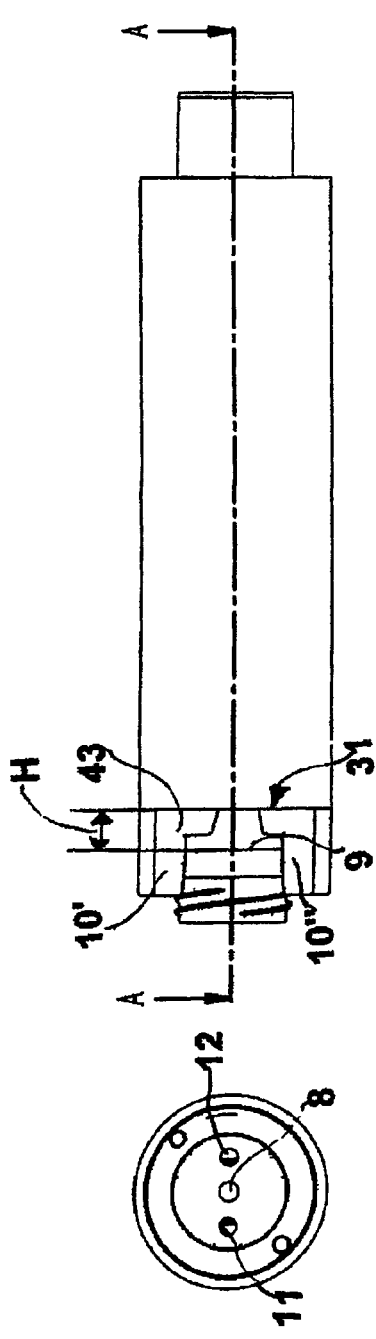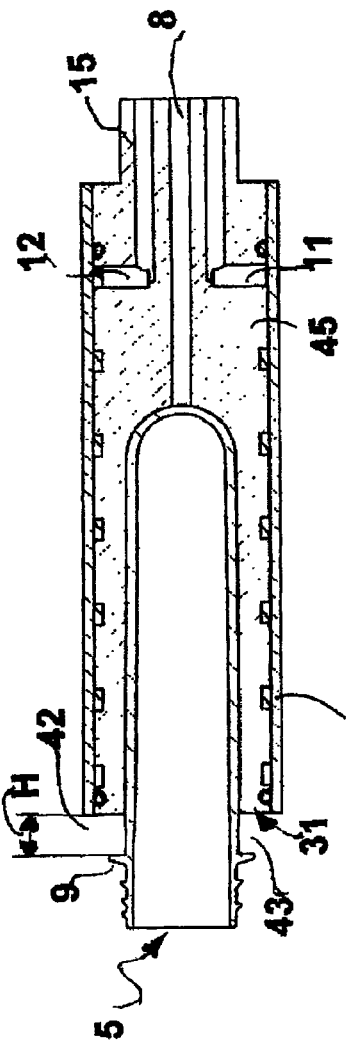

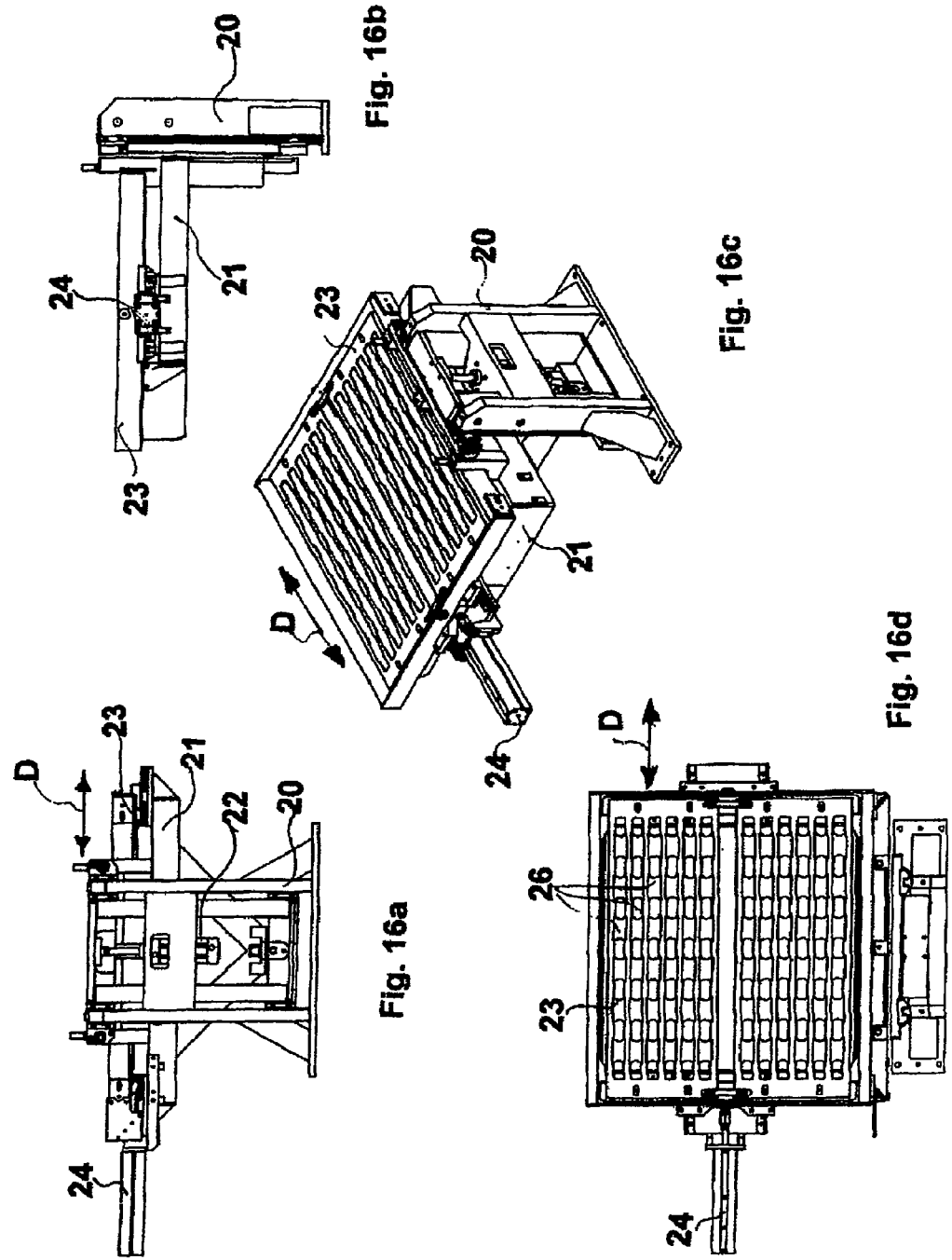

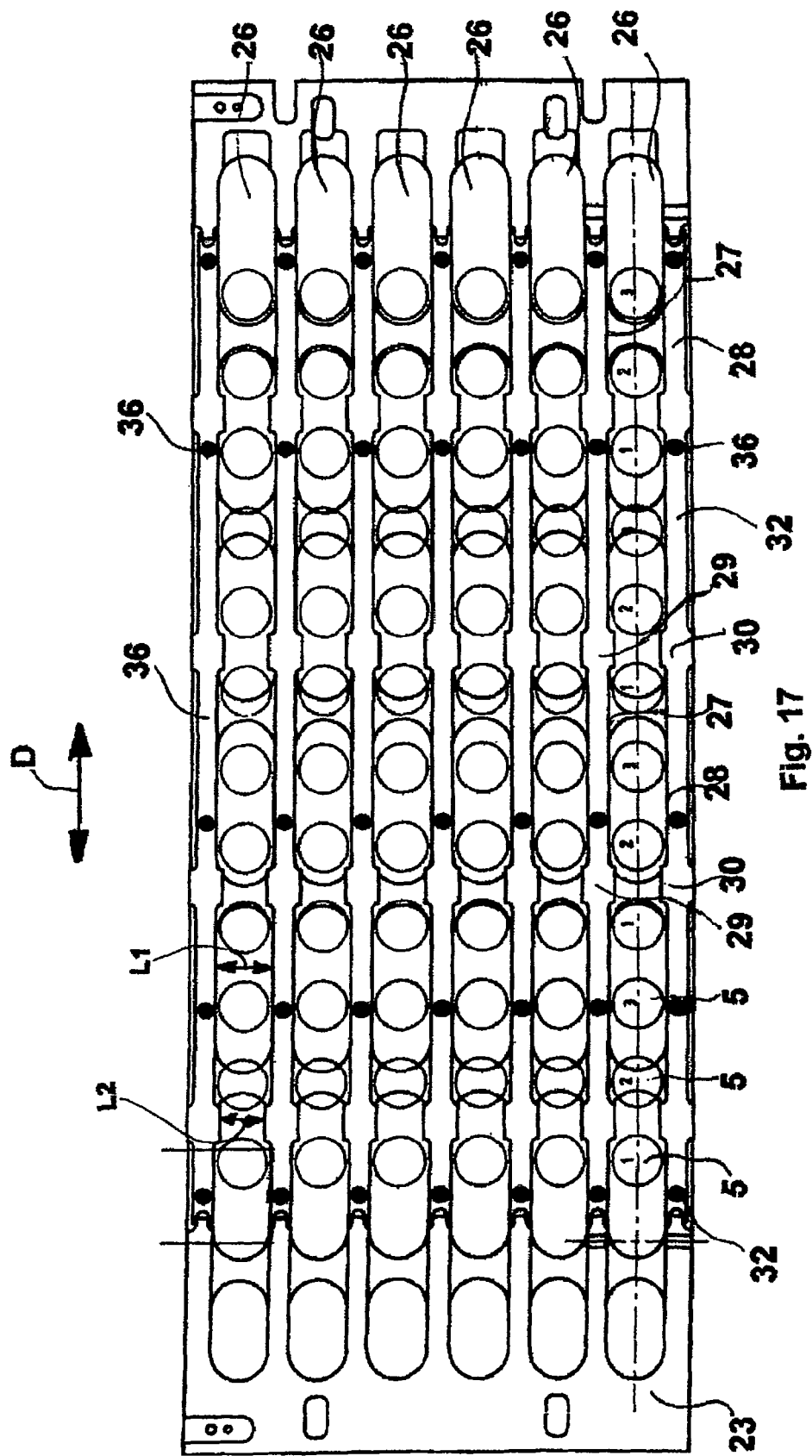

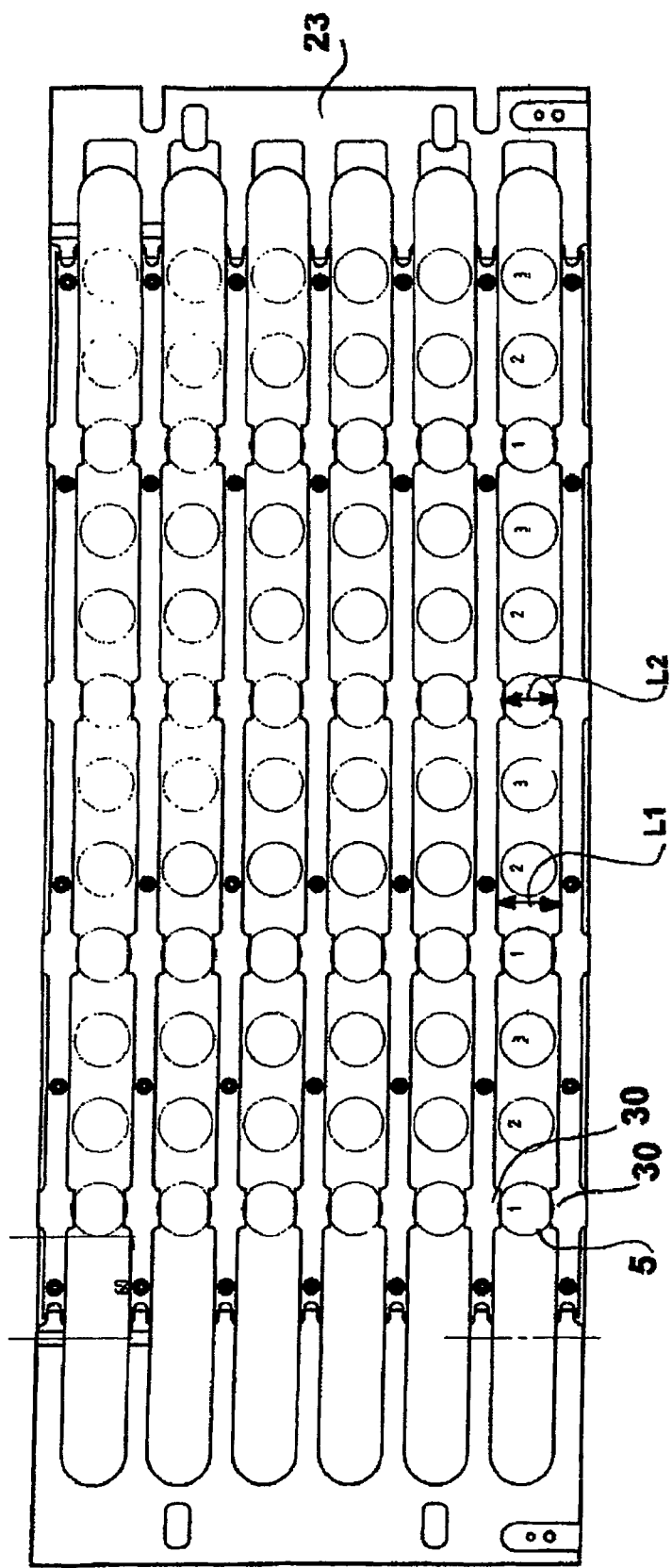

DEVICE AND PROCESS FOR EXTRACTING PLASTIC ITEMS

TECHNICAL FIELD

This invention relates to a device for extracting plastic items from cooling devices. More particularly, it relates to a device for use in injection moulding plants producing many plastic items simultaneously, such as "preforms" (i.e. preform moulds, blanks, unfinished parts/products, workpieces), that are used later in blow moulding plants to make containers, especially plastic bottles or pots. This invention also relates to the corresponding extraction process.

BACKGROUND ART

Plastic materials, such as PET (polyethylene terephthalate), have been used for some time now to make containers. This is particularly true for food-containing containers, especially drinks. Although said containers can be of different types, they shall be referred to hereinafter generically as bottles, which happen to be the most popular kind.

Two main production processes are used to make plastic bottles; both processes involve making an intermediary product, the so-called <<preform>>. The first type of process is a single-stage process and comprises injection and blow moulding machines forming a single-stage plant. The term <<single-stage>> is appropriate because the plant carries out the complete transformation process of the plastic in a continuous and automatic manner: from the pellet state to the finished, ready-to-use containers.

The second type of process is essentially the same as the first except that it is a <<multistage>> process: after the injection moulding stage, the obtained preforms are pre-cooled to a specific temperature and, then, stored in an intermediate storage place to be cooled further until they reach room temperature. The blow moulding stage of the process is carried out later and, obviously, requires the preforms to be heated beforehand so that the resin is soft enough to be shaped. The first stage of the production process for making containers (i.e. injection moulding to produce preforms) utilizes moulds (specifically, split moulds—each made up of two mould halves—that open and close) with many injection mould cavities. The resin in the molten state is injected into said cavities and remains in the closed mould to cool for a specific amount of time until the preform has solidified enough to allow safe handling without deformation. Since the preform occupies the mould during cooling and solidification, it follows that the longer the preform is cooled inside the mould, the slower the moulding process. In fact, the mould can only be used in the next cycle after it has been opened and freed of the preforms.

For the sake of completeness, it should be remembered that the complete injection moulding stage involves closing the moulds, injecting the resin in the molten state into the injection mould cavities, cooling the resin to solidify the structure of the preforms enough to enable handling, opening the moulds, and ejecting/removing the preforms. This stage, which directly affects and limits the productivity of the container production plant, is the so-called <<bottleneck>> of the production line and lasts longer than the other stages carried out by the plant. Furthermore, it is very difficult to shorten the duration of this stage; thus, improvements in the process have focused on shortening the cooling time inside the mould as much as possible and completing a significant part of the cooling after ejecting the preforms from the mould.

The increasing demand for plastic bottles, and for plastic containers in general, and the need to boost productivity to remain competitive mean that both single-stage and multistage moulding machines must minimize the amount of time the moulds remain occupied during the injection and cooling operations.

State-of-the-art injection and blow moulding plants try to accomplish this by ejecting the preforms as soon as possible after the injection step, completing cooling on special cooling plates fitted with special holders. Known types of cooling plates may comprise means for force cooling the preforms by circulating cooling fluids.

As was already mentioned, the cooling plate is fitted with a number of holders, having a shape that normally complements the contour of the preforms; the holders are held in position and cooled by a system that circulates a cooling liquid. The advantage of using said holders is that the deformation of the structure of the preforms is almost entirely eliminated during the cooling step.

Another means used to accelerate even further the injection moulding cycle in known injection and blow moulding plants is to equip the cooling plate with extra cooling holders (for example, double or triple the number of injection mould cavities). In this way, while an injection moulding cycle is being carried out in the mould, the preforms produced and ejected during the previous cycle(s) are being cooled in the holders of the cooling plate. Thus, by choosing the appropriate number of holders, the cooling stage can last approximately twice or three times the duration of the injection moulding cycle in the mould. Patent Application IT-PN2000A000006 describes an injection moulding plant of the type described above.

Unfortunately, said plant is somewhat complex to make and control. Furthermore, it requires a large number of components that make it expensive to construct and maintain. Unfortunately, the system for extracting the preforms from the cooling turret is quite complex because it uses a large number of hydraulic or pneumatic actuators.

SUMMARY OF THE INVENTION

It is an object of this invention to provide a device for extracting plastic items, such as preforms or containers, that resolves the aforementioned problems. Said device is straightforward and reliable to use; helps the injection moulding plant achieve high productivity levels; is cost effective to make, control, and maintain; and is safe.

It is another object of this invention to provide a simple-to-implement process for extracting plastic items, such as preforms or containers, suitable for high-capacity bottle making lines.

In accordance with a first aspect of the invention, these objects are achieved by means of a device for extracting plastic items from holders comprising a supporting structure equipped with gripping means suitable for extracting the items from the holders. Said items comprise a first part with a predetermined crosswise dimension and a second, adjacent part with a crosswise dimension greater than the first. Furthermore, a plate is constrained to the supporting structure and said gripping means comprise many slits with first sections of a first predetermined width. Said slits are straight and arranged in parallel to each other, so that they all face a specific direction, and each slit comprises second sections of its length forming constrictions of a second predetermined width, which is smaller than the dimensions of the second part of the item and greater than the dimensions of the first part of the item. The first width allows the second part of the items to fit into the slit; this is not the case for the second width. Finally, control and operating means are included to make the plate move in the appropriate direction by a determined length.

In accordance with another aspect of the invention, the above objects are achieved by means of a process for extracting many plastic items from their holders using the aforesaid device, which comprises a plate with straight and parallel slits having first wider sections and second sections with constrictions. The items remain in said holders until the plastic reaches a specific consistency; then, the moulded items are extracted. The extraction process comprises the following steps:
a) Nearing the holders containing the plastic items to the extracting device,
b) Fitting the items into the slits by making the second wider part of the items fit through the wider areas of the slits,
c) Moving the plate by a predetermined length in the appropriate direction until the second wider part of the plastic items comes into contact with the constrictions in the slits, slotting the items into the plate,
d) Moving the plate and the holders away reciprocally to extract the items from the holders.

Preferred alternative versions of the invention are described in the dependent claims. Other objects and advantages of the invention shall be readily apparent from the more detailed description of the preferred versions of the invention, given as examples that do not limit the scope of the invention.

BRIEF DESCRIPTION OF THE DRAWINGS

FIG. 11a shows an enlargement of a detail of FIG. 11;
FIG. 13a shows an enlargement of a detail of FIG. 13;
FIGS. 15a), b), c), and d) show views and sections of another enlarged detail of the plant in accordance with this invention;
FIGS. 16a), b), c), and d) show views and sections of another enlarged detail of the plant in accordance with this invention;
FIGS. 17, 18, 19, and 20 show plan views of the functional design of the item depicted in FIG. 16 during four different operating stages.

DESCRIPTION OF A PREFERRED EMBODIMENT OF THE INVENTION

Figure 1:
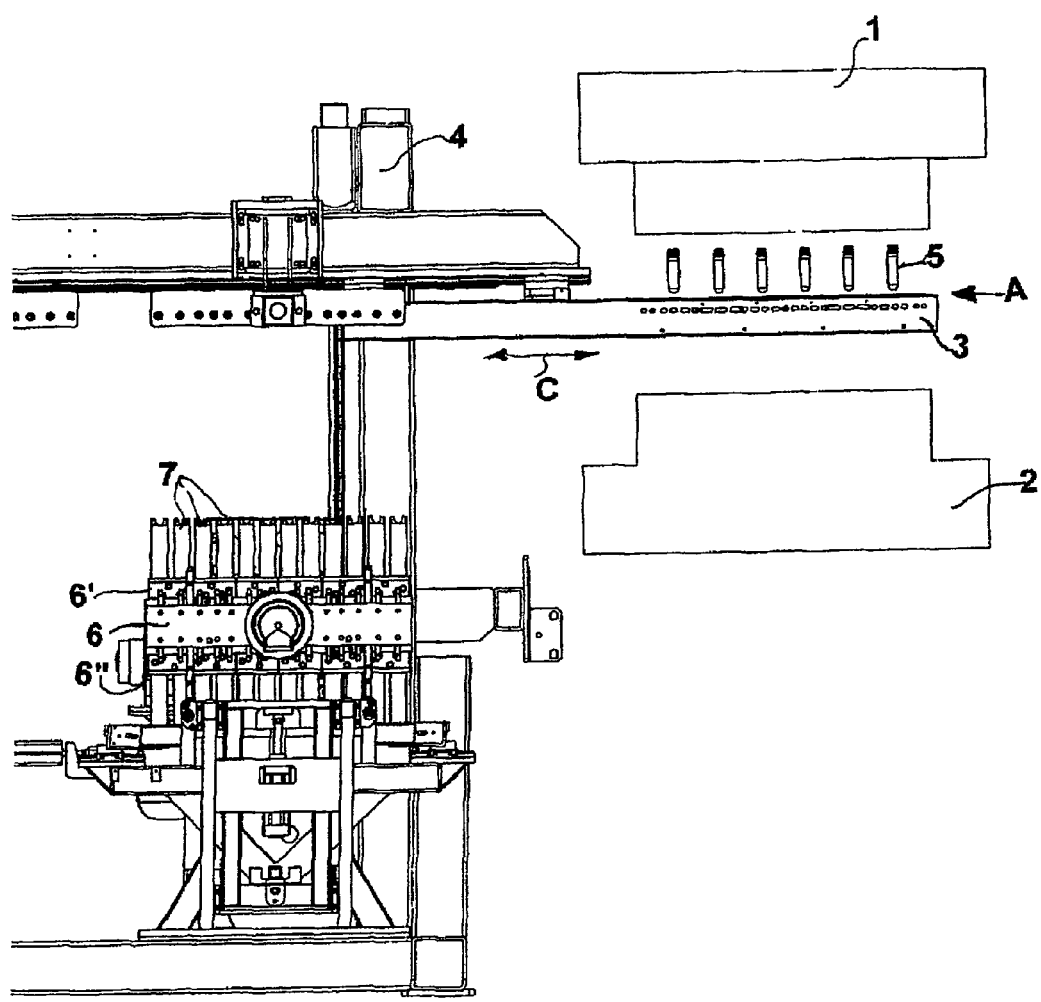
FIG. 1 shows a schematic, side view of the plant in accordance with this invention during a first operating stage.

The Figures show the device in accordance with this invention for moulding preforms. Said device comprises an injection mould of the known split mould kind —having two mould halves 1, 2 that open and close—operated by a press; when this mould is in the closed moulding position, it forms many injection mould cavities which are not shown in detail in the Figures where the preforms are formed. The device includes a bearing structure 4 that supports a component for collecting, holding, and transferring the preforms, namely an arm 3. This arm can move in the direction of the arrow <<C>> and can move into the space vacated by the two open mould halves 1, 2 at the end of an injection moulding cycle. The arm 3 is able to house the preforms 5 that are released in a known manner—through a guillotine mechanism not shown in detail in the Figures—by the top mould 1. As was already mentioned, this operation takes place when the arm 3 moves into the space left when the split mould 1, 2 opens; when the arm is appropriately positioned, the preforms 5 are released by the mould and housed in specific housings. The function of these housings is to intercept the preforms 5 released by the top mould 1 with appropriate gripping devices fitted above the arm 3; the preforms fall under gravity, are collected in an orderly manner, and arranged vertically, i.e. with the neck facing upward. Then, they are transferred above the rotary turret 6 and, finally, they are allowed to fall under gravity into the appropriate holder 7.

The guillotine gripping system comprised in the arm 3 supports the preforms when transferring them from the space between the split mould to their destination in the holders of the cooling turret 6 and releases them with a simple releasing operation. The arm 3 comprises housings for the preforms arranged in rows and spaced so that they align exactly with the predetermined positions of the cooling holders 7 of the turret 6. Thus, each row of arm 3 housings can be positioned exactly on top of a corresponding row of rotary turret 6 holders 7. In consecutive cycles, the arm 3 is able to fill all the holders 7 fitted onto the faces of the rotary turret 6. Each time, the arm unloads a load of preforms 5 into a different set of holders 7 simply by moving and positioning the arm 3 appropriately on top of the specific face 6' or 6>> of the rotary turret 6. The clamping device of the arm 3 consists of two plates: a top plate 40 and a bottom plate 41. The top plate 40 is used to centre the neck and features a predetermined number of holes with a diameter a little larger than the diameter of the neck of the preform. The bottom plate 41 moves and is a true guillotine; this plate features a number of slotted openings, having a width smaller than the diameter of the neck of the preform, ending in a hole, which instead has a diameter larger than the neck of the preform. The second plate 41 can slide selectively against the top first plate. The slotted openings each consist of a first part with a section that allows the passage of the body of the preform, but not of the neck, and a second part with a section that allows the passage of the entire preform, including the large-diameter ring placed at the base of the threaded neck. Preferably, to facilitate the interception and the centring of the falling preform, the top part of the holes in the top plate 40 is flared upward with a truncated conical shape.

The conditioning device comprises the rotary turret 6 for conditioning the preforms; more specifically, the turret is used to lower the temperature of the preforms that leave the injection press until the plastic has a consistency deemed adequate for moving onto the next steps of the production process. The turret 6 consists of a body in the shape of a parallelepiped fitted with two opposite faces 6', 6>> of larger size. The same number of cooling holders 7 is fastened to each face. Although this description refers to a version of the invention having a turret equipped with holders on two opposite faces, the turret may also be equipped with holders on one face only or on more than two faces for example, three or four. In this case, the sectional shape of the turret will match the one of the corresponding geometric figure. These solutions may be more suitable for other outputs per hour of the mould or for other preform sizes.

Figure 14:
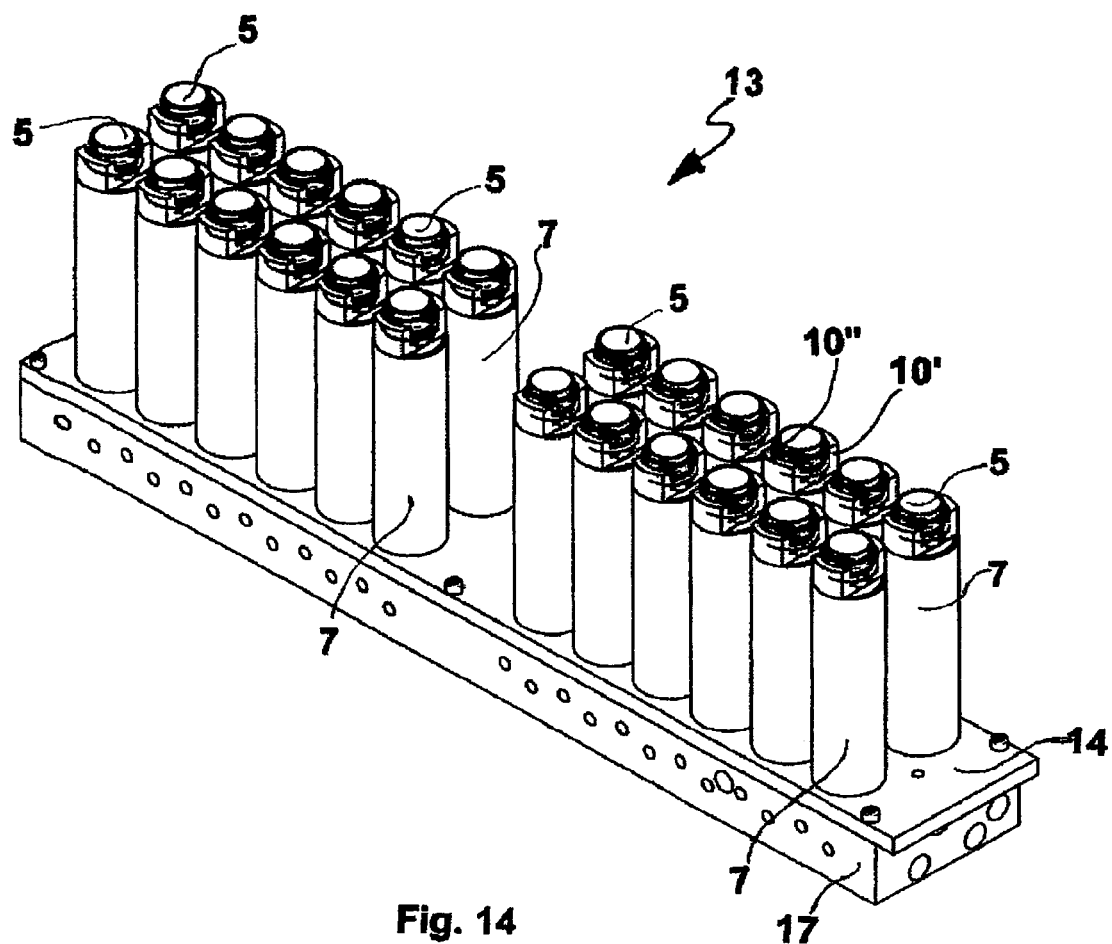
FIG. 14 shows an enlarged, axonometric view of part of the plant in accordance with this invention.

Each preform 5 is housed in a single holder 7. The holders are sized so that they match the external contour of the preform perfectly. FIGS. 14 and 15 show a detail view of a preferred version of the holders 7 in accordance with the invention. Ideally but not necessarily, the holder includes means for the side containment of the preforms 5. For example, these can be containment surfaces or guides 10', 10>> of the ring 9, which delimits the threaded part of the neck. These guides are suitable for controlling and/or minimizing through contact the radial movements of the open end of the preform 5 attributable to thermal deformations such as, for example, the ones resulting from the previous handling operations. The guides 10', 10>> are placed symmetrically in relation to a meridian plane of the holder and extend in the longitudinal direction of the holder. While remaining within the scope of the invention, the guides can consist of a single component, which contains the open end of the preform with a suitable wrapping angle, or more than two components.

The guides 10', 10>> are shaped to define, inside the holder, the side supporting surfaces against which the open end of the preform 5 rests against sideways, i.e. in the radial direction, following its deformation.

Experts in the field shall be able to determine the shape of the inside of the holder and of the side supporting surfaces starting from the geometry of the preform; alternatively, they shall be able to determine all parts to adapt them to each other.

The supporting surfaces is/are shaped and sized so that there is at least a minimum radial opening, or also a negative radial allowance, with a predetermined value between the surfaces and the chosen supporting section of the preform.

Alternatively, the inside contact surface(s) of the guides can be sectors of a flared or truncated conical surface that opens toward the outside of the holder, also to take into account the thermal reduction of the diameter for example, of the ring 9 or other contact surface at the open end.

The opening surface of the guides can form a large flare that opens outward to welcome the preforms that are fitted into the holder.

The devices described above may also be used to straighten preforms 5 deformed when hot by previous automatic handling operations for example, while transferring them from the injection mould to the cooling holders.

In a second preferred version of the invention, the containment surfaces 10', 10>> are machined from the outside sleeve 44 instead of from the inside body 45. This second version is easier to make and can be fitted onto an existing inside body without containment surfaces 10', 10>>; furthermore, it can help accomplish a preform shape-changing operation simply, i.e. the inside body 45 can house preforms with rings of different diameters after changing the outside sleeve 44.

At the end surface 31 of the holder, the two guides 10', 10>> are cut sideways along two axial and parallel planes to form two passageways 42, 43 beside the guides 10', 10>>. After fitting the preform 5, these passageways define a distance <<H>> between the end surface 31 of the holder and the ring 9 of the preform.

Alternatively, the containment means of the preforms 5 in the holders can consist of a system for suctioning the air from the area between the bottom of the holders and the outer cap of the preform through a channel 8. A combination of the two systems is also possible. This allows the turret 6 to rotate in such a way that the preforms 5 in the holders fitted onto the face 6' or 6>> facing downward at a particular time do not fall from the holders 7 thanks both to the force of gravity and to the centrifugal force generated by the rotation of the turret. The rotation of the turret 6 around the horizontal X-axis, which is essentially orthogonal to the direction <<C>>, allows the two opposite surfaces 6', 6>> to exchange position, alternately making each one face upward or downward. In this way, the empty holders 7 will face the preforms 5 transported by the arm 3.

In advantageous versions of the invention, other spatial positions can be used for the X-axis of the turret that are askew in relation to the <<C>> direction.

Cooling is carried out by means of known methods—for example, by circulating cool water around each holder through ducts 11, 12. The holders 7 can also be utilized, using known means, for conditioning the preforms in more general terms.

Each of the wider faces of the turret 6 is equipped with many holders 7 arranged in such a way and number that they can be grouped in many separate distribution layouts, which are geometrically identical, that can be placed on the same face at the same time. FIGS. 13, 14, 21, and 22 show a detail view of each face covered with several similar units 13: for example, in the shape of rectangular or square plates. The holders 7 are attached to these plates by inserting an appropriately shaped base 15 in a specific hole, made in the plate 14, having a complementary shape.

A second plate 17, with a greater thickness and an equal surface, is coupled with the first plate 14; this second plate serves to increase the structural strength besides housing the required ducts for conveying fluids to the holders.

Preferably, but not necessarily, the rows of holders 7 that make up the layout are placed parallel to each other; the entire surface of the faces of the turret 6 is occupied by plates 14 placed side by side and by the holders 7.

The plates 14, 17 are placed side by side in a number adequate to satisfy the design sizing requirements of the cooling turret 6, also considering the size of the holders that is related to the diameter of the preforms. In fact, the larger the preforms, the smaller the number of holders fitted onto each face 6', 6>>. The dimensions of the plates 14, 17 are defined based on the number and/or diameter of the holders 7 that must be fitted. It is desirable to design the components of the rotary turret 6 in a modular way: this makes changing the holders 7 to produce plastic containers of a different size much simpler and quicker. Furthermore, the cost of making the turret 6 is cheaper compared to the one required to make the state-of-the-art turrets.

Another advantage of the arrangement in accordance with the invention is that the plates 14, 17 essentially form an element for connecting and mechanically supporting the holders 7; in addition, they are easier to make, since they are not crossed by circuits for conveying fluids, air, or vacuums. An advantage in having two coupled plates 14, 17 forming the faces of the turret 6 in accordance with the invention is that the top plate 14 can be replaced by itself when it becomes necessary to change the holders to make preforms of another dimension; obviously, this is only possible when making preforms that fall within a specific size range, meaning that it is not necessary to change the number of holders on a face of the turret 6. Instead, if it is also necessary to change the number of holders to make preforms of quite different dimensions, the bottom plate 17 must also be changed, since the circuits found in this plate differ in terms of number and size.

An advantageous alternative version in accordance with this invention includes an additional plate 14'; the sole purpose of this plate is to plug up those holes that are unnecessary when using plates 14, 17 of another size.

The plates 14, 17 are supported at one end by a bar 18 in the shape of a parallelepiped that, besides supporting the plates 14, 17, groups together the ducts required for the holders 7 to condition the preforms. Essentially, these are ducts and manifolds 30, 31 that supply and evacuate the cooling fluid, and ducts of the pneumatic system that suction the preforms into the holders and optionally, in alternative versions of the invention, blow air to help eject the preforms from the holders this is carried out at the same time as the mechanical extraction, which shall be described further on. If necessary, the bar 18 can include other features. In order to facilitate the replacement of the plates 14 as the sizes of the holders change, some holes 34, 35 may be made in the bar 18; these holes may be greater in number than required and are placed in appropriate positions aligned with different plate 14 configurations. When fitting the plates 14 for a particular size of holders, some of the holes 34, 35 are aligned with the ducts used to convey the fluids, while other holes are unnecessary and, hence, plugged up with stoppers not shown in the Figures. It follows that when the plates 14 are changed again to use holders 7 of other sizes on the turret 6, the holes that were previously in use are now plugged up, while the other holes 34, 35 are unplugged and connected to the fluid circuits that supply the holders. This solution makes it possible to use a single bar 18 for a very extensive range of holder dimensions.

The plates 14, 17 are supported at a second end by a second bar 19, which is also essentially a parallelepiped in shape. If necessary, in additional versions of the invention, this bar 19 can also house the services of the turret. The bar 18 also serves to connect structurally the supporting element 33 of the turret, which also controls the rotation around the X-axis and the vertical movements.

The turret 6 is lightweight because its core is hollow. The construction is simplified and modular making it easy and quick to replace the groups 13 of holders; this is not the case for rotary turrets of the known kind, which must be replaced entirely every time the cooling holders must be changed for whatever reason.

The injection moulding device of preforms in accordance with the invention also includes control means, which are not described in detail, for operating the plant and carrying out the injection moulding process. Said means control the positioning of the arm 3 every time the preforms made in an injection cycle are unloaded; specifically, the arm is positioned above and aligned with the holders to be occupied on the outside faces 6', 6>> of the turret 6. In this way, the preforms released by the arm 3, by means of the guillotine mechanism, fall under gravity into the selected holders 7 of an external face 6' or 6>>.

The rotary turret 6 is equipped with motorized members which are of a known kind and are not shown in detail in the Figures that control the rotation.

The rotary turret 6 can move up or down in an essentially vertical and controlled manner the holders fitted onto the external faces of the turret, which must receive the preforms 5, must come as near as possible to the corresponding holders of the arm 3 in order to ensure precise centring and housing of the preforms 5. When the turret 6 moves down away from the arm 3, it can rotate freely around the X-axis without interfering with the arm 3 above, or also simply with the preforms 5 protruding downward out of the way of the arm 3.

The moulding device in accordance with the invention comprises extracting means suitable for selectively releasing the preforms 5 from the holders 7 when the plastic has reached the predetermined temperature. Generally, this is the temperature at which the plastic has a structural consistency that allows the preforms to be transferred safely to the next stage of the production process; however, the temperature is chosen as a function of the production process.

FIGS. 16 to 20 show detail views of the preferred means in accordance with the invention for extracting the preforms 5 from the holders 7. These means consist of a supporting structure 20 that supports a table 21 and comprises a device for adjusting the height from ground level 22. Ideally, this device is equipped with a safety system for emergencies or motor runaways for example, if the turret does not stop at the right height and continues its travel downward. The table 21 supports on its top surface a plate 23 with a series of longitudinal slits 26 all arranged parallel to each other; essentially, these cover the entire useful surface of the plate 23. The plate is equipped with appropriate means, such as guides not shown in detail in the Figures, for sliding the plate in the direction of the arrows <<D>> both ways in relation to the fixed table 21, which is fixed to the ground or simply to the structure of the moulding plant. A motor 24—or other similar means of the pneumatic, hydraulic, or electric type—moves the plate 23 and maintains it in any intermediate position for the amount of time deemed necessary to extract the preforms.

Ideally, these slits are through slits in the plate 23 so that the preforms engaged for extraction from the holders of the turret fall under gravity. Thus, the preforms pass through the table 21, which includes an appropriate opening in the central part where the preforms are removed from the holders of the faces 6', 6>> of the turret 6 to drop them onto a conveyor belt or into an appropriate container which is of the known kind and, consequently, not shown in the Figures. The thickness of the plate 23 at the edge of the slits is chosen so that the edges of the slit in the sections or teeth 29, 30 can engage the rings 9 of the preforms by fitting into the cut-outs 42, 43 present between the outer edge 31 of the holders 7 and the ring 9. The extraction teeth 29, 30 can be machined from the plate 23 or from bars 32 or similar filling items fastened to the plate 23 with screws 36. Other solutions are also possible while remaining within the scope of the invention.

The geometry of the slits 26 found in the plate 23 that is shown in plan view in FIG. 16a can be better understood by looking at FIG. 17, which refers only to a portion of the plate 23 for example, a third or half, illustrating optimally the whole geometry of the slits. The given example shows a number of holders 7 on each face of the cooling turret; this number is three times greater than the number of cooled preforms that are removed from the turret during every extraction cycle. This equals a total number of holders on the turret six times greater than the one of the preforms produced during each moulding cycle. In this particular version, the rings of the preforms 5 are shown with some thin-lined circles in the positions in which the cooling turret moves the preforms near to the extracting plate 23, with the opening facing downward. Along their length, the slits 26 have many sections 29, 30 that create constrictions in the slits 26 at predetermined distances: the so-called teeth. In addition, the slits feature many sections 27, 28 with a width L1 slightly greater than the diameter of the ring of the preforms 5, interspersed with constricted sections 29, 30 that have a width L2 smaller than the first width L1. In this way, the preforms fit into the slits 26 for a section adequate to form the common plane defined by all the rings 9 of the preforms 5, when they are held in the holders 7 of a face 6' or 6>> of the turret 6 at such a level that the constrictions of the slits or teeth can grip the rings 9 by fitting into the spaces or cut-outs 42, 43.

Figures 8, 8A:
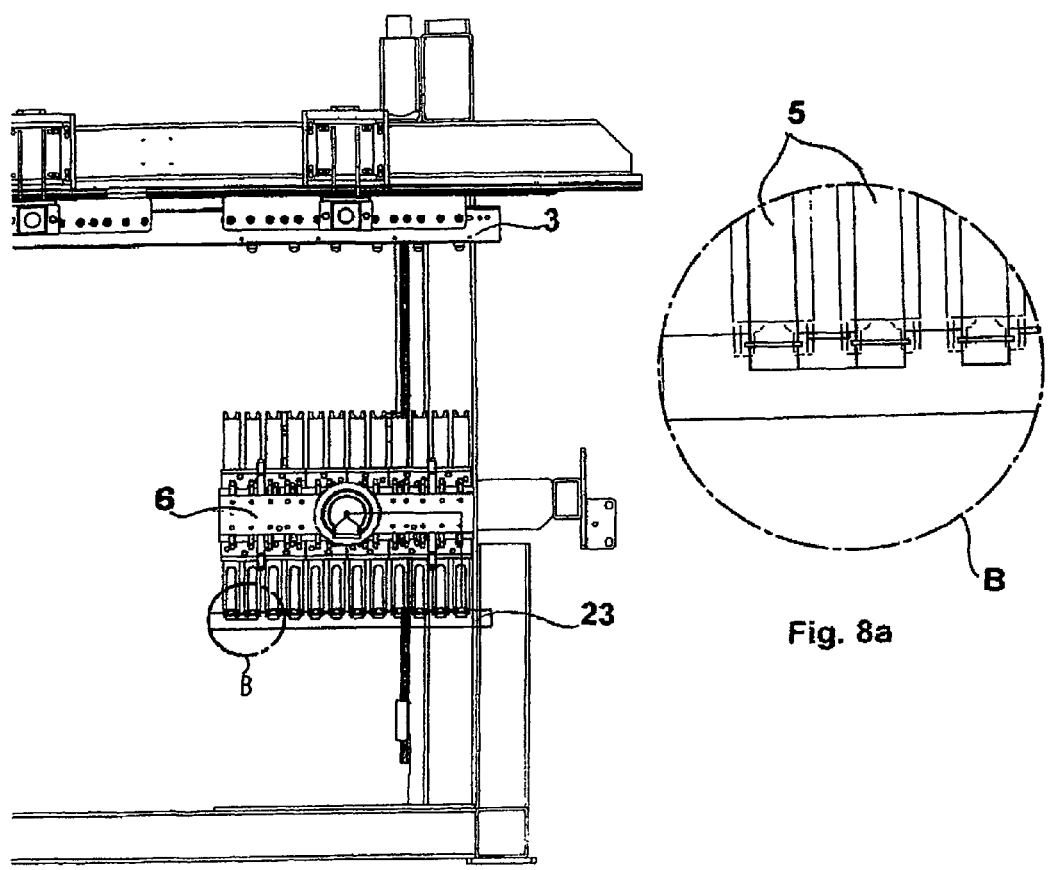
FIG. 8 shows a schematic, side view of the plant depicted in FIG. 1 during a sixth operating stage.
FIG. 8a shows an enlargement of a detail of FIG. 8.
Figures 9, 9A:
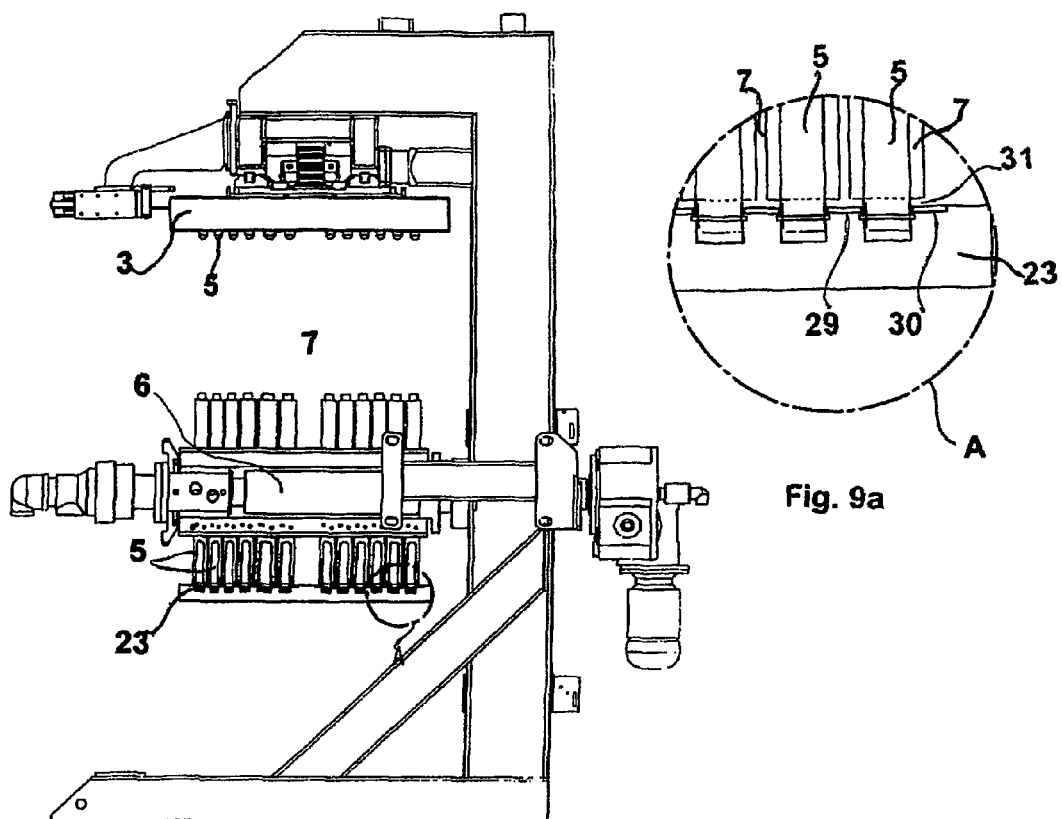
FIG. 9 shows a schematic, side view of the plant depicted in FIG. 1 during a seventh operating stage.
FIG. 9a shows an enlargement of a detail of FIG. 9.
Figures 10, 10A:
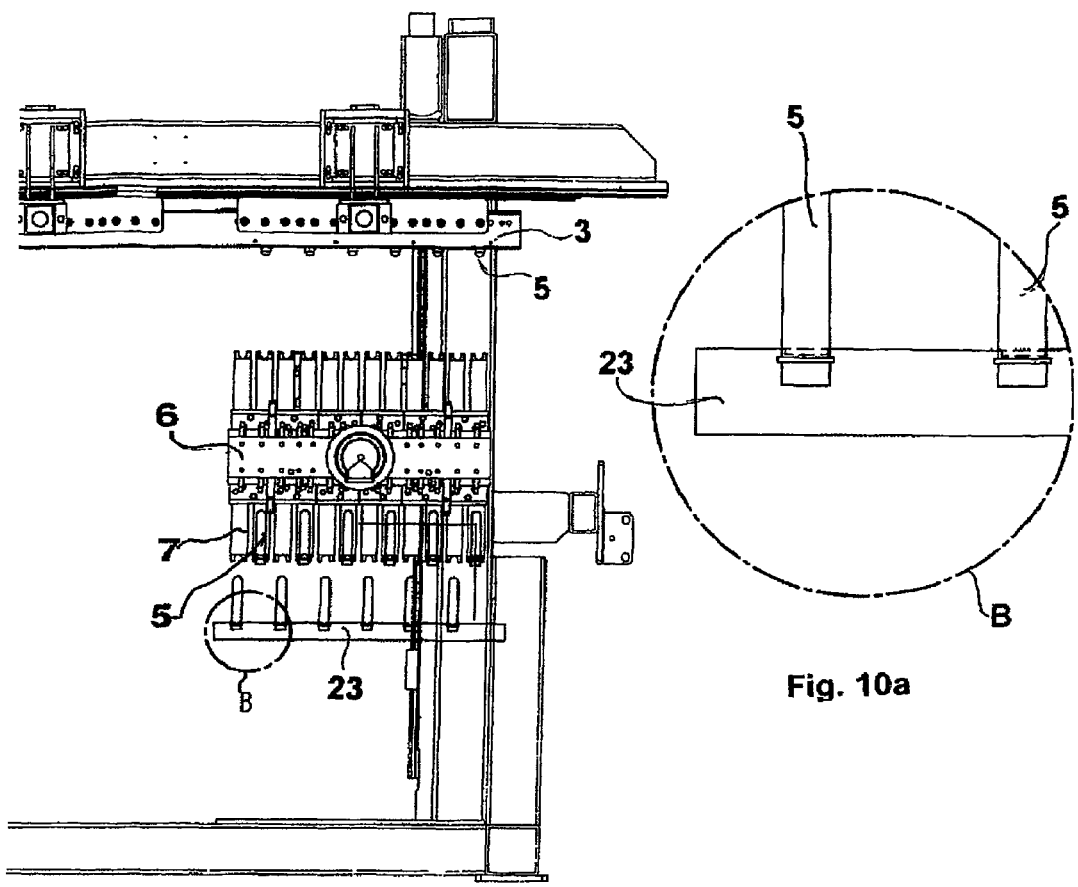
FIG. 10 shows a schematic, side view of the plant depicted in FIG. 1 during an eighth operating stage.
FIG. 10a shows an enlargement of a detail of FIG. 10.
Figure 19:
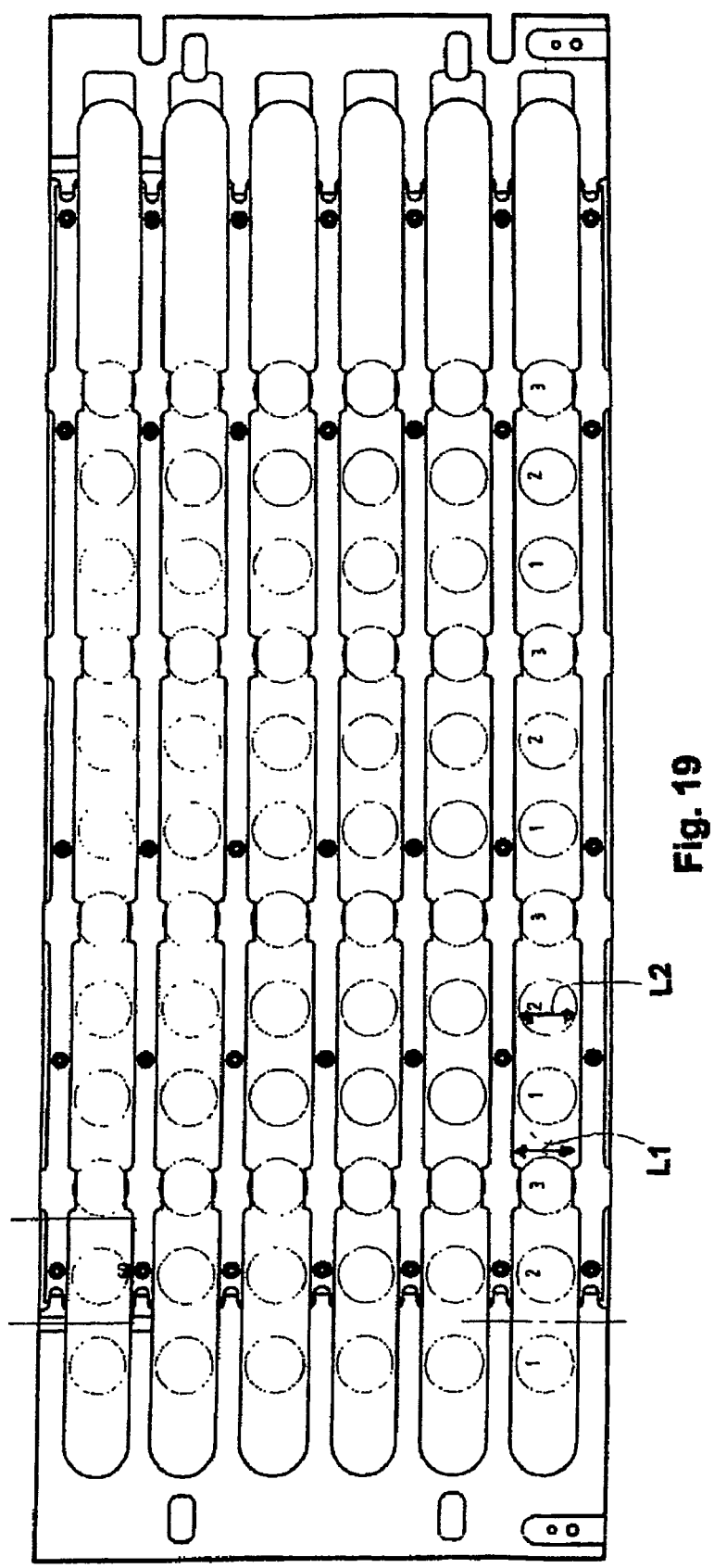
Figure 20:
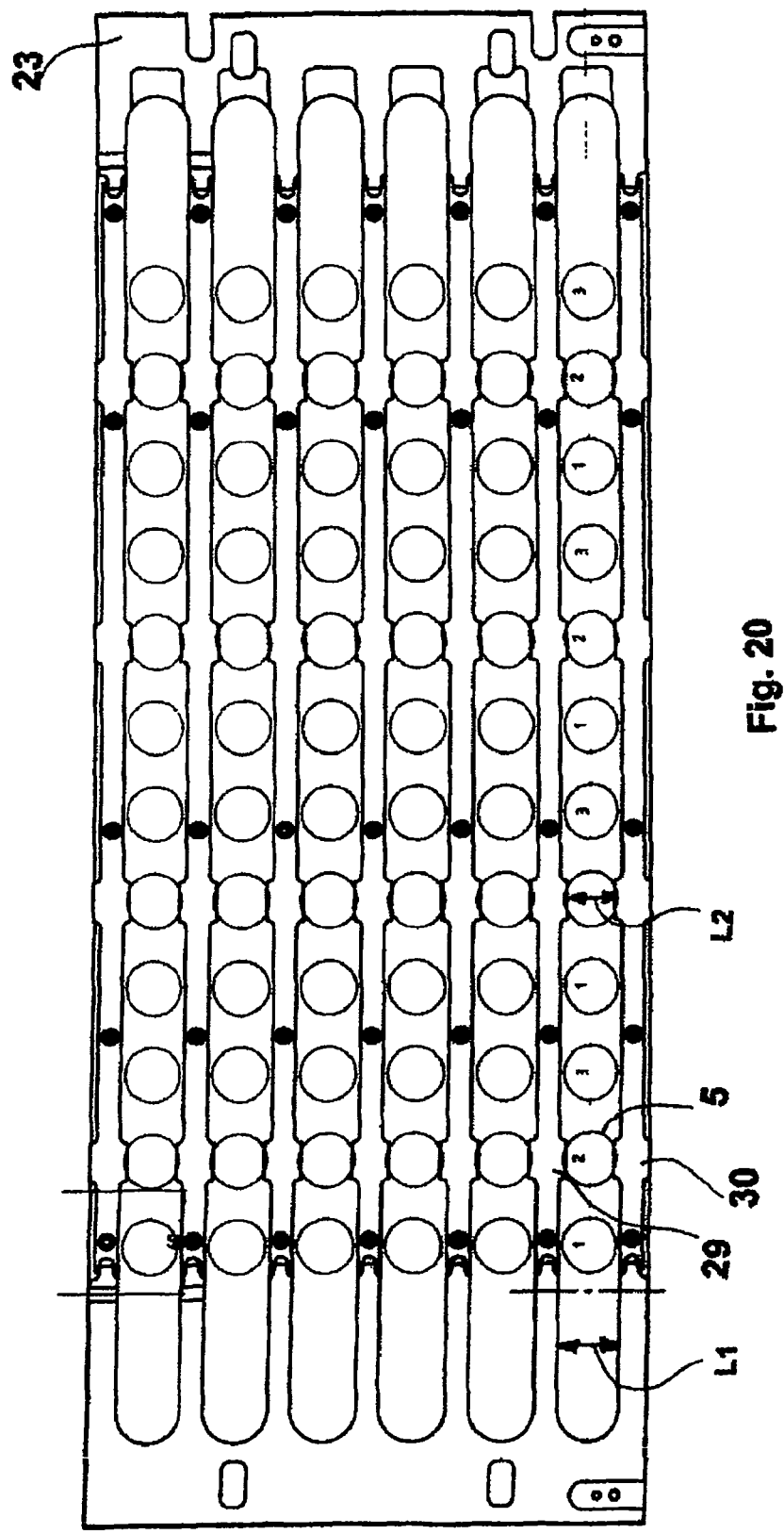
Figure 21:
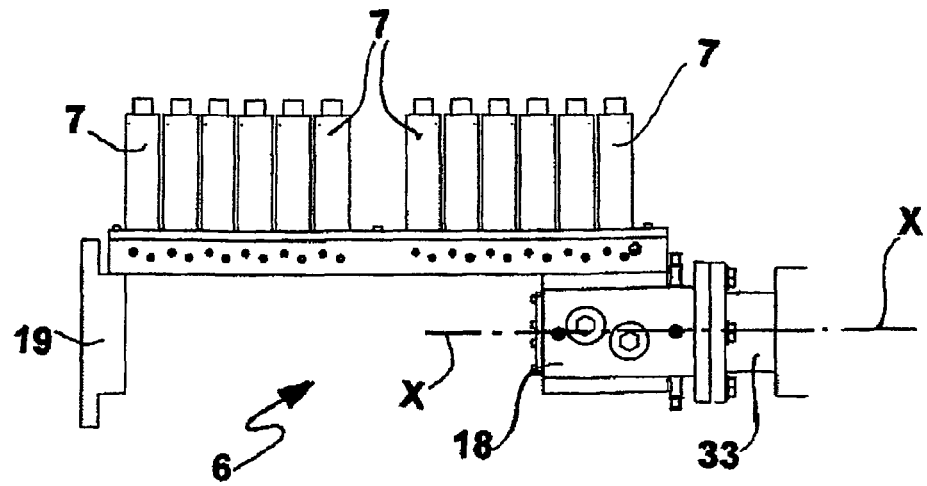
FIG. 21 shows an enlarged, side view of a detail of the plant in accordance with this invention.
Figure 22:
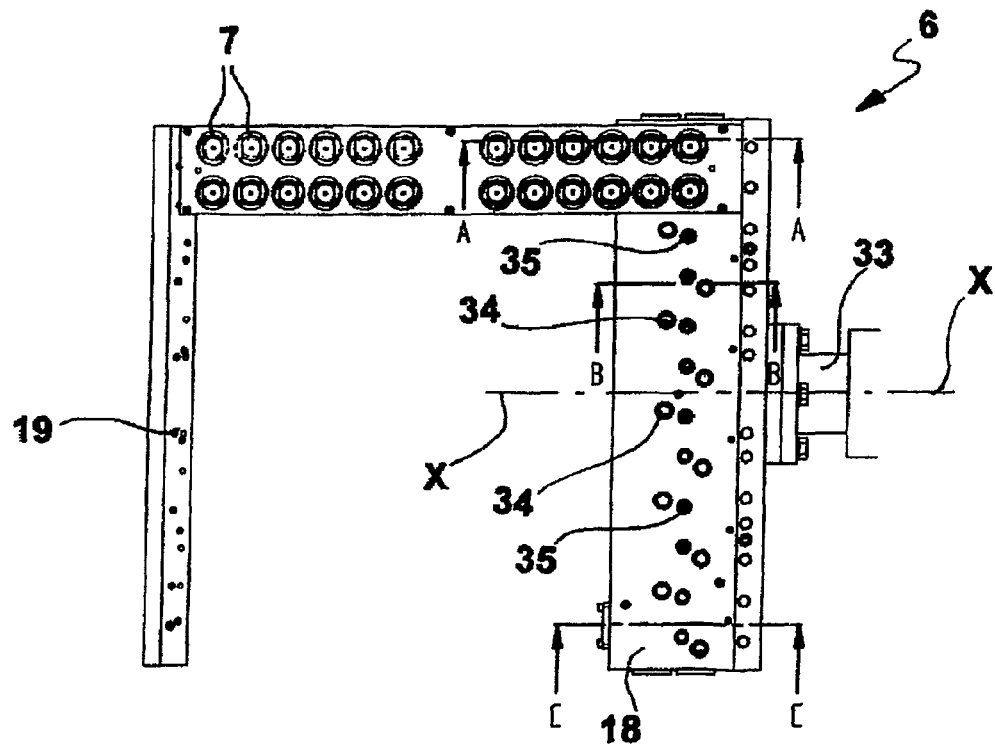
FIG. 22 shows a plan view of the detail depicted in FIG. 21.
Figure 23:
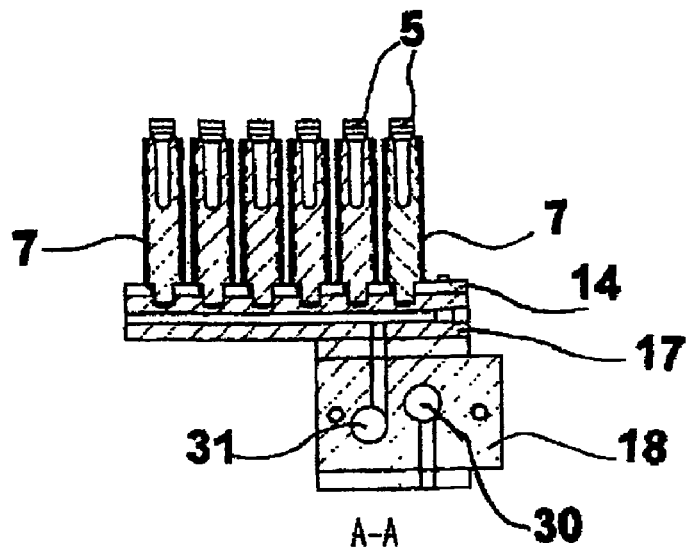
FIGS. 23, 24, and 25 show sectional views on different planes of the detail depicted in FIG. 21.
Figure 24:
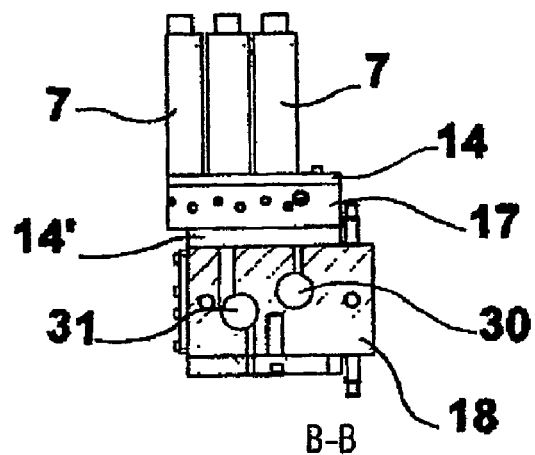
Figure 25:
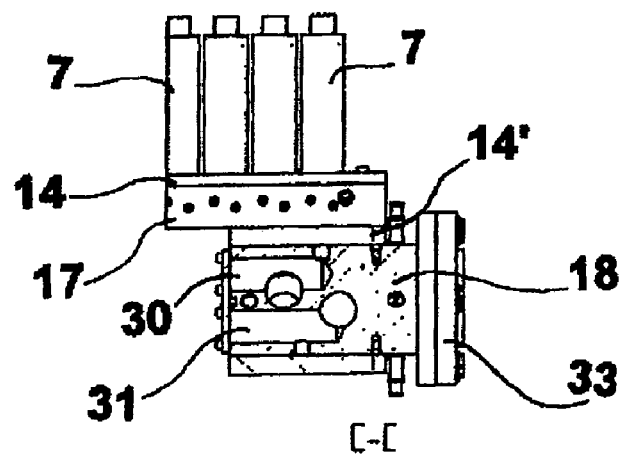

In the example in question, the plate 23 for extracting the preforms 5 from the holders 7 is used to extract a preform from each group of three adjacent preforms during each extraction cycle. Thus, the length of each wide section 27, 28 allows the passage of a group of at least three preforms placed side by side on the same row of a face 6' or 6" of the turret 6 when lowering the turret 6 onto the plate 23. When moving the plate 23 in the direction of the arrow <<D>> by a section equal to the distance between the axes of two adjacent preforms, the teeth 29, 30 fit into the free space between the rings 9 and the end surface 31 of the holders and, in this way, engage the rings 9 as shown in FIG. 9a. FIG. 8a shows the teeth 29, 30 in the disengaged position, and FIG. 10a shows the engaged teeth ready for extracting the preforms. When lifting the turret 6 and moving it away from the extracting plate 23, the teeth 29, 30 hold several preforms: specifically, one of every three present on the face of the turret 6. The other two preforms of each group remain in their holders to continue cooling. Once each preform 5 is completely released from its holder 7, it falls downward going through the openings in the table 21. The plate 23 is again moved by a distance equal to the distance between the centres of the two holders 7 to allow the passage of groups of three preforms through the spaces 27, 28. The above cycle is repeated every time the turret is lowered toward the extracting plate and, every time the plate 23 is moved in the direction of the arrow <<D>> by the distance required to make the teeth 29, 30 engage those preforms that have finished the cooling process in the holders. These steps are shown in detail in FIG. 17, which shows the entry position of the preforms into the extracting plate 23, and FIG. 18, which shows the position of the extracting plate 23 when gripping the preforms of the row on the left with reference to the position shown in the Figure and of all the rows interspersed with three holders from the first. FIG. 19 shows the unloading position of the preforms of the second row after the first and of those interspersed with three holders, and FIG. 20 shows the unloading position of the third row and of those interspersed with three holders. As an alternative to lifting the turret 6, it is also possible to lower the plate 23 to extract the preforms 5 from the holders 7, or use a combination of the two types of movements i.e. lowering the plate 23 and lifting the turret 6.

While remaining within the scope of this invention, it is possible to use extracting means with the table 21 and the plate 23 in a vertical or slanting position, in an appropriate area of the mould where it can anyhow interact operationally with the turret 6. Once again, the extraction movements occur by the reciprocal moving away of the turret 6 and the table 21 and the plate 23. In this version, if necessary, guiding means of the preforms could be included behind the plate 23; these means would be removed from the holders to help them fall or be conveyed elsewhere.

While remaining within the scope of the invention, the plate can be arranged to act on groups of two preforms during every extraction cycle from the holders 7. Obviously, this results in shorter cooling cycles in the holders; the plate can also act on groups of four preforms, which results in longer cooling cycles.

What follows is a description of the injection moulding production process of plastic preforms in accordance with the invention, referring to Figures from 1 to 12 and from 17 to 20 that show schematically the sequential moulding stages of the preforms 5 carried out using the previously described injection moulding device in accordance with the invention.

Figure 2:
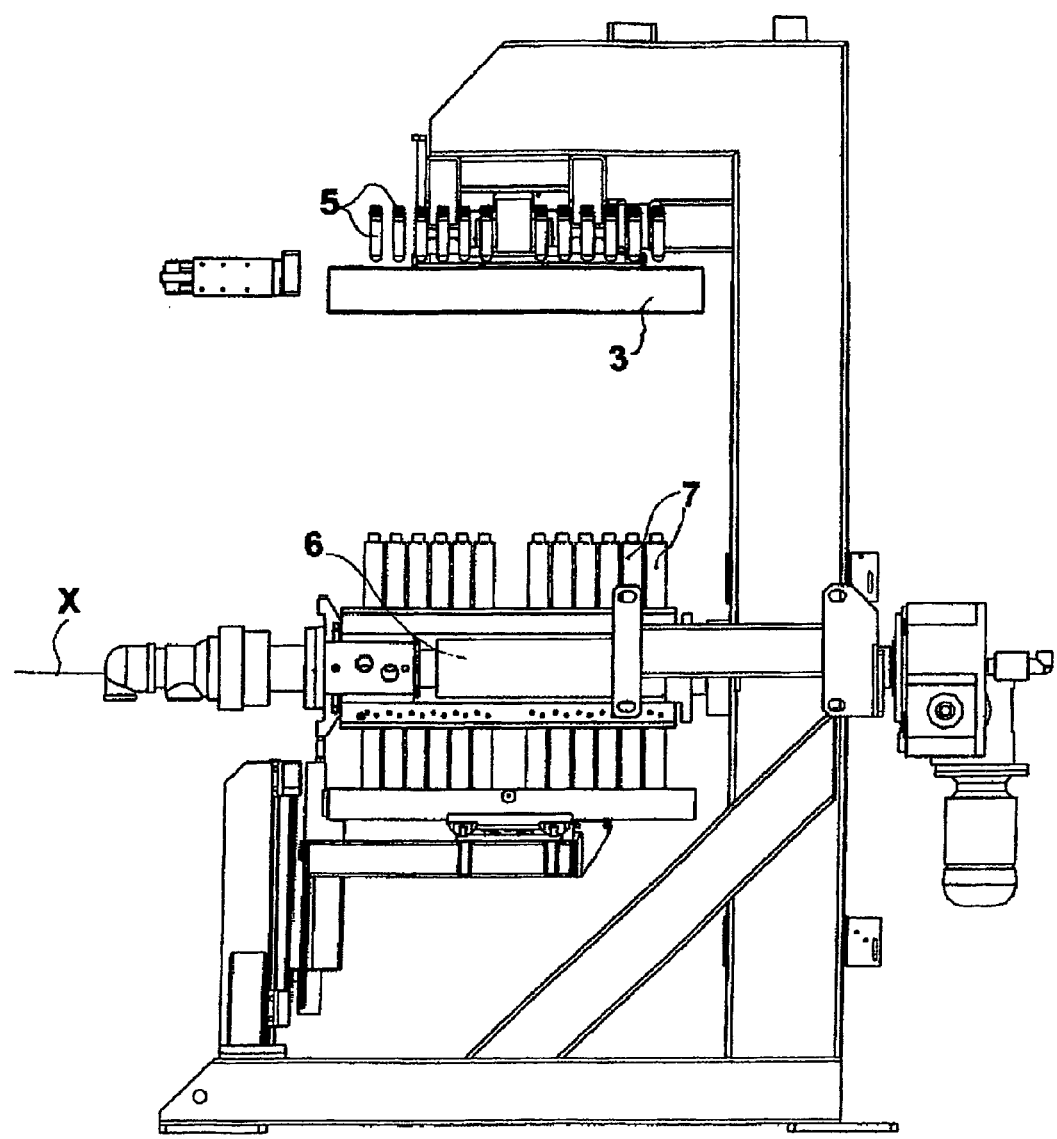
FIG. 2 shows a side view in the direction of the arrow <<A>> of the plant depicted in FIG. 1.
Figure 3:
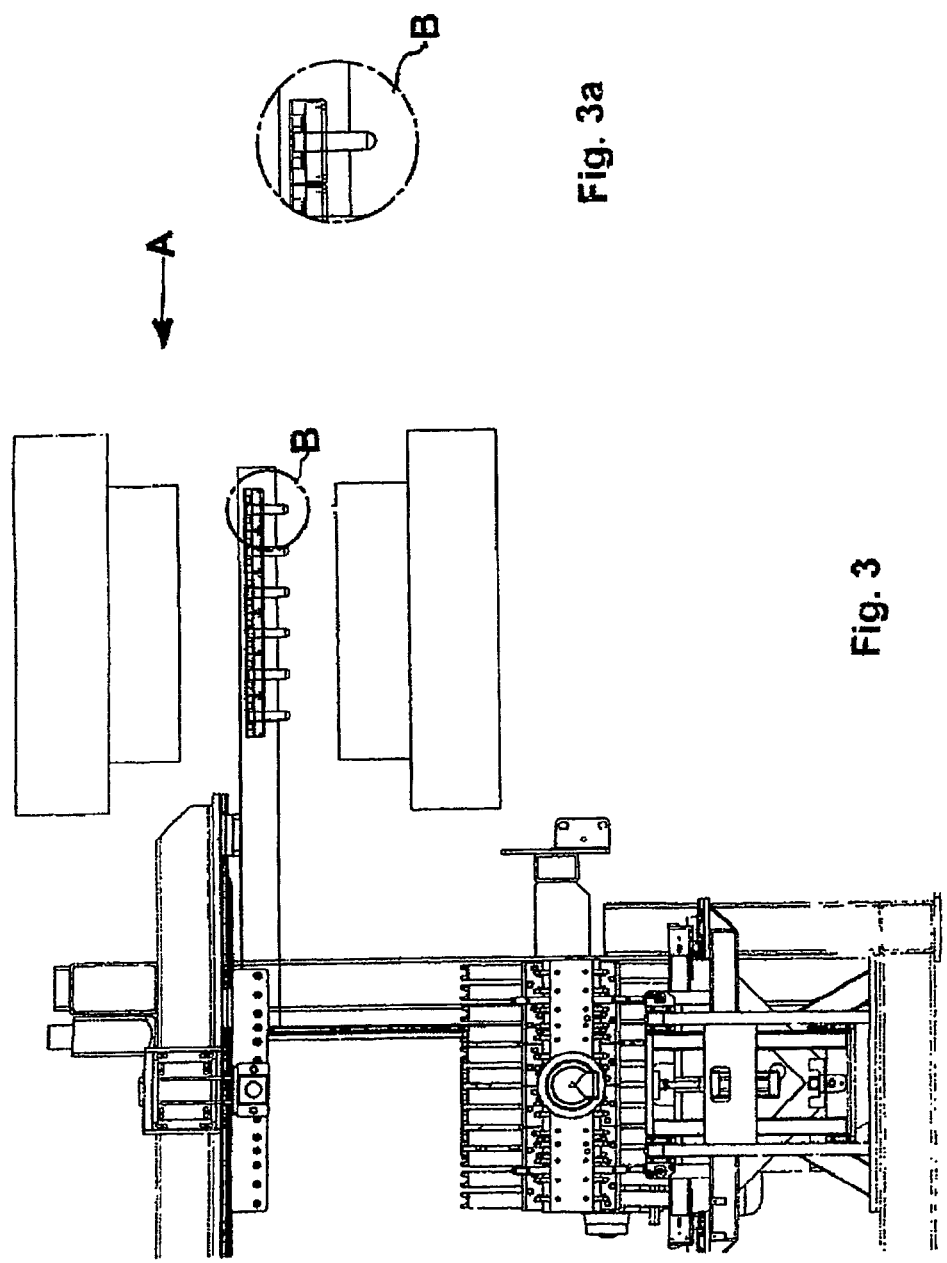
FIG. 3 shows a schematic, side view of the plant depicted in FIG. 1 during a second operating stage.

FIGS. 1 and 2 show the first stage wherein the preforms 5, just after being injected into the mould, are released by an injection top mould 1 and fall under gravity onto the arm 3. Here, the preforms 5 are held since the guillotine 40, 41, in a first position, allows the body of the preform to pass but not the neck because of the presence of the ring 9, which has a larger diameter see FIG. 3 and an enlarged detail in FIG. 3a.

Figures 4, 4A:
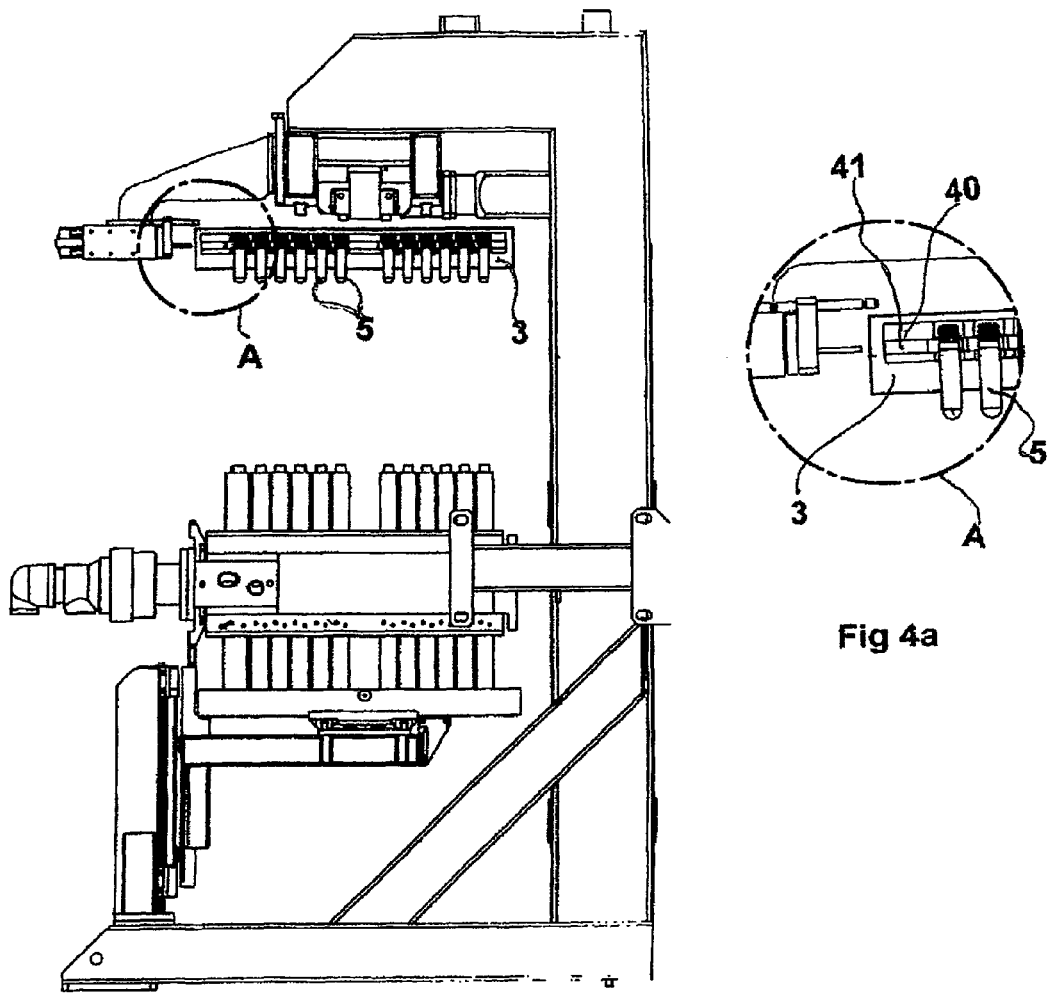
FIG. 4 shows a side view in the direction of the arrow <<A>> of the plant depicted in FIG. 3.

FIG. 4 shows the next stage wherein the arm 3 moves on top of the rotary turret 6, which has one of its faces 6', 6>> in the horizontal position and the holder openings facing upward, so that the geometry of distribution of the arm 3 is exactly on top of the layout of the holders i.e. three in the example; however, other versions are possible depending on the duration of the moulding and cooling cycles. During the transfer, the preforms 5 are contained sideways both by the guillotine 40, 41 and by the centring of the neck.

Figures 5, 5A:
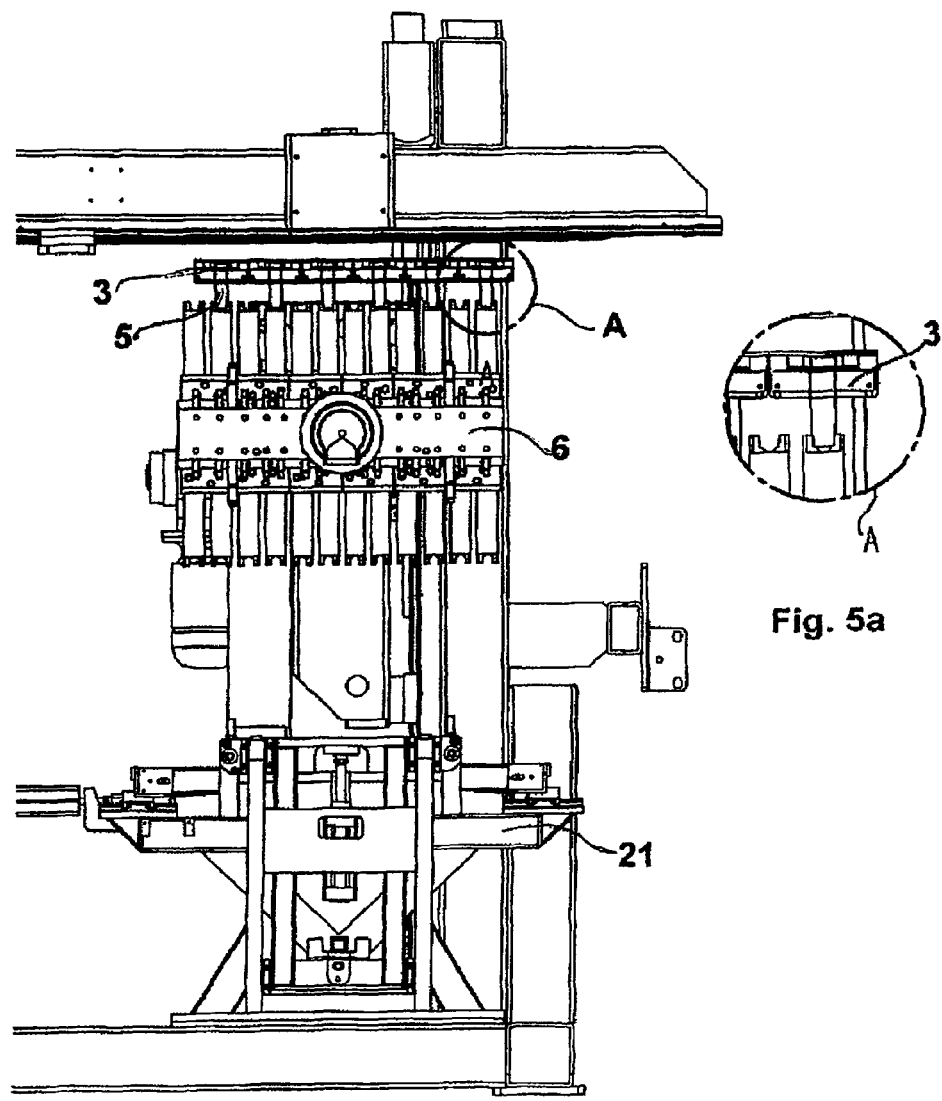
FIG. 5 shows a schematic, side view of the plant depicted in FIG. 1 during a third operating stage.
Figure 6:
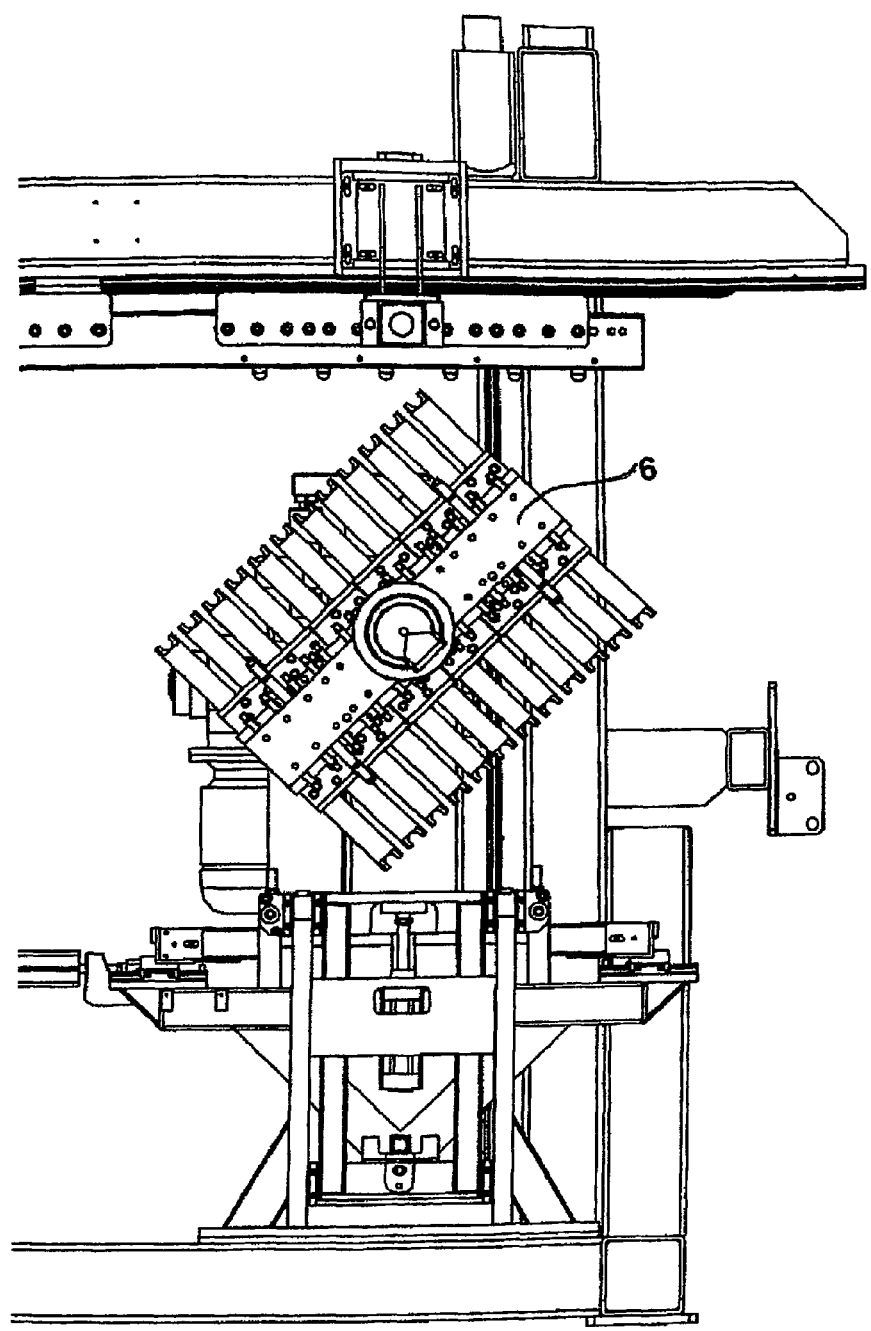
FIG. 6 shows a schematic, side view of the plant depicted in FIG. 1 during a fourth operating stage.

In the stage shown in FIG. 5, the turret 6 is raised as near as possible to the arm 3. Then, the preforms are released by operating the guillotine 40, 41, they fall under gravity, and fit into the corresponding holders 7. Each loading operation of the preforms from the arm 3 onto the turret 6 involves positioning the arm 3 in a predetermined position, depending on the layout of the holders 7 that must be filled, in order to position the preforms in the right place before releasing them.

As soon as the load of preforms is received during a specific cycle, the turret 6 is lowered and, thus, can be turned around its X-axis even before the arm 3 has moved from the unloading position on top of the turret 6 to the loading position between the injection split mould 1, 2. In this way, the operation and, thus, the working time of the rotary turret 6 is independent from the working time of the arm 3.

Then, the turret 6 is turned 180° around its X-axis so that the preforms are positioned with the neck facing downwards. In the initial stage of filling all the holders 7 of the turret 6, the turret is not lowered towards the extracting plate 23; this stage can be considered an initial transient state. The groups of holders are filled in a predetermined order and controlled by the control means of the plant. After each 180° rotation of the turret 6 around the X-axis, the next cycle of collection and insertion of a next group of preforms 5 is carried out. This process is identical in each cycle so that at the end of the initial stage all the holders 7 are filled with preforms 5 and, then, the operation of unloading the groups of preforms 5 starts between one loading operation and the next.

Figure 7:
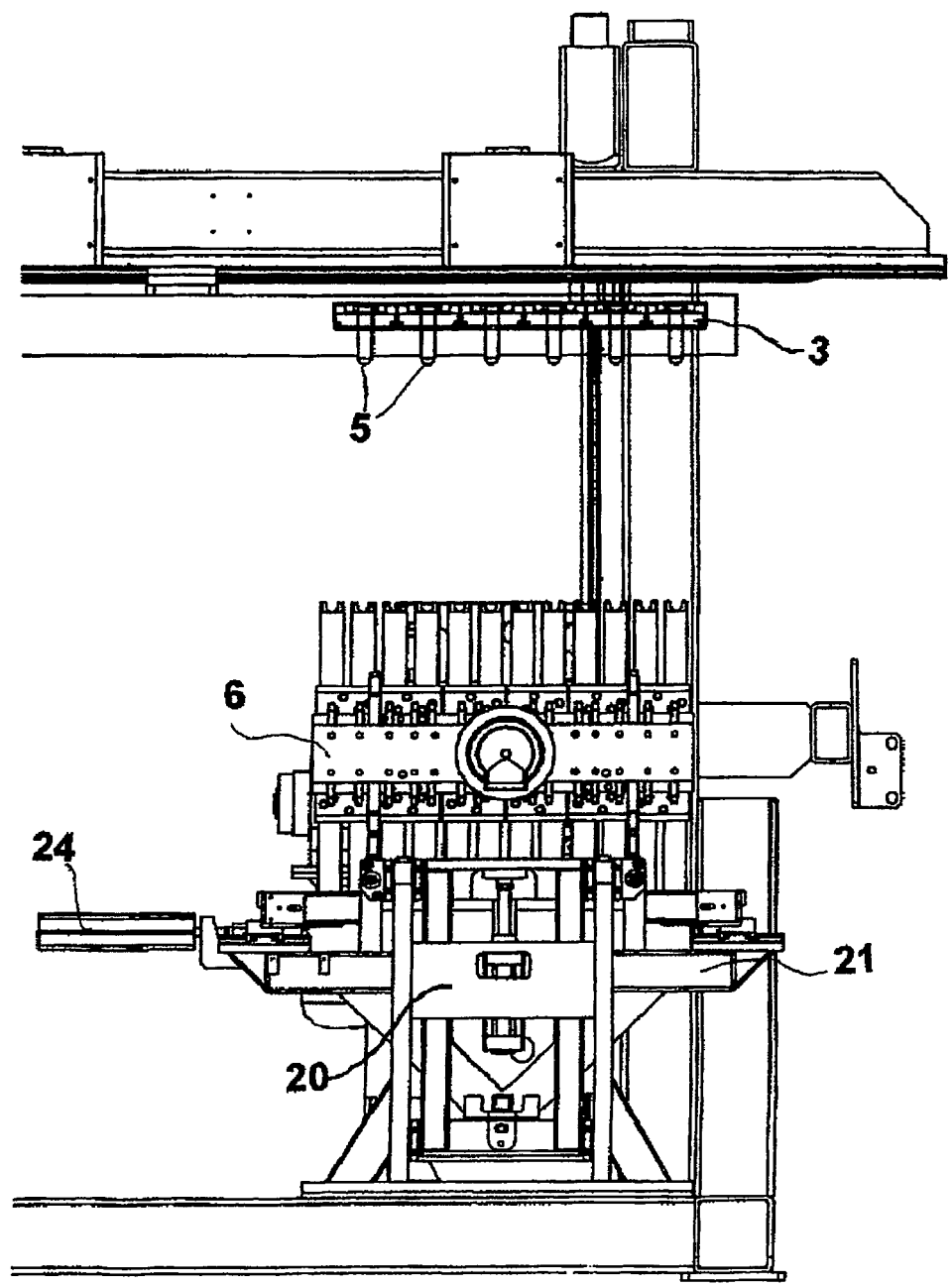
FIG. 7 shows a schematic, side view of the plant depicted in FIG. 1 during a fifth operating stage.
Figure 11:
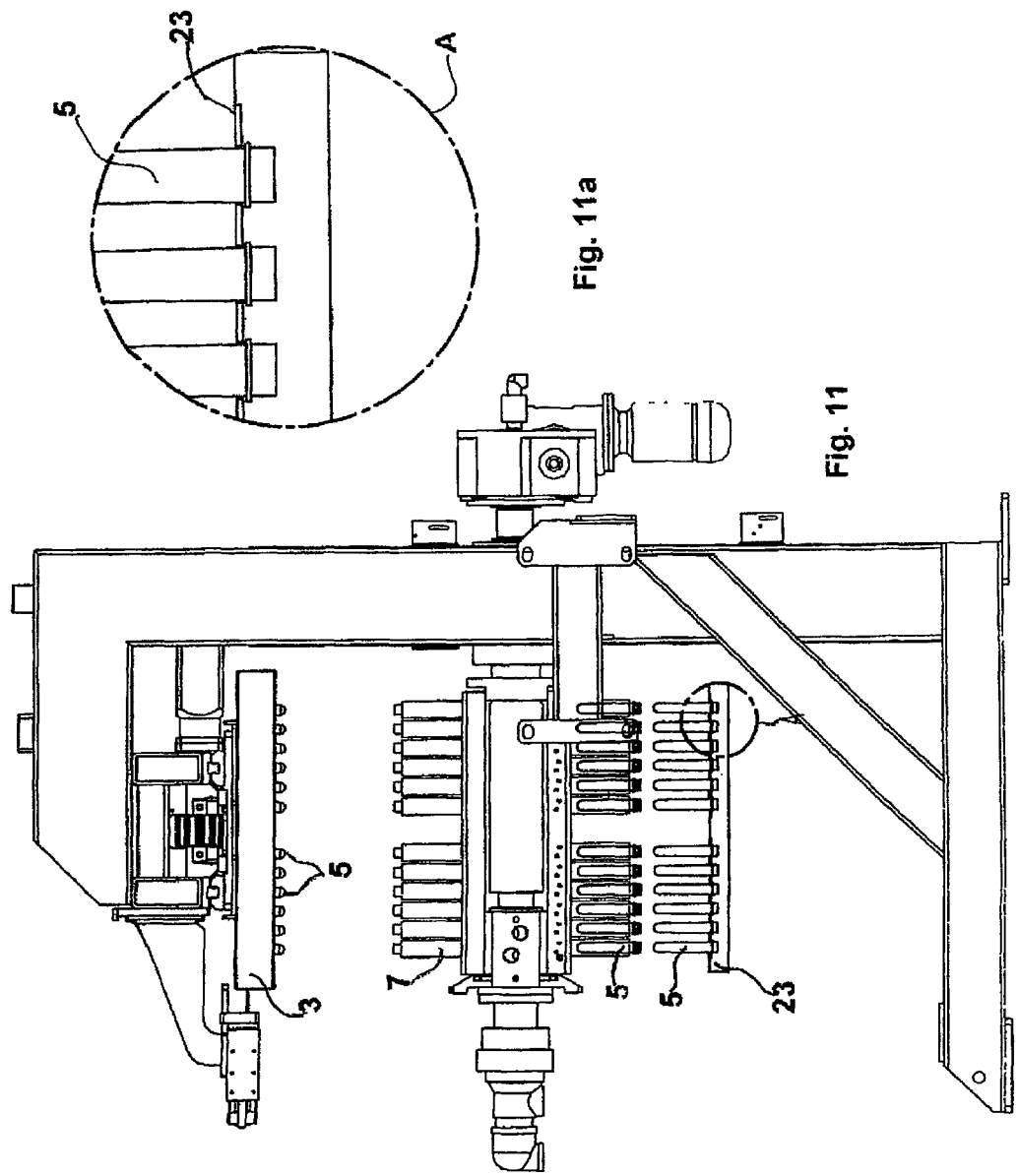
FIG. 11 shows a schematic, side view of the plant depicted in FIG. 1 during a ninth operating stage.
Figure 12:
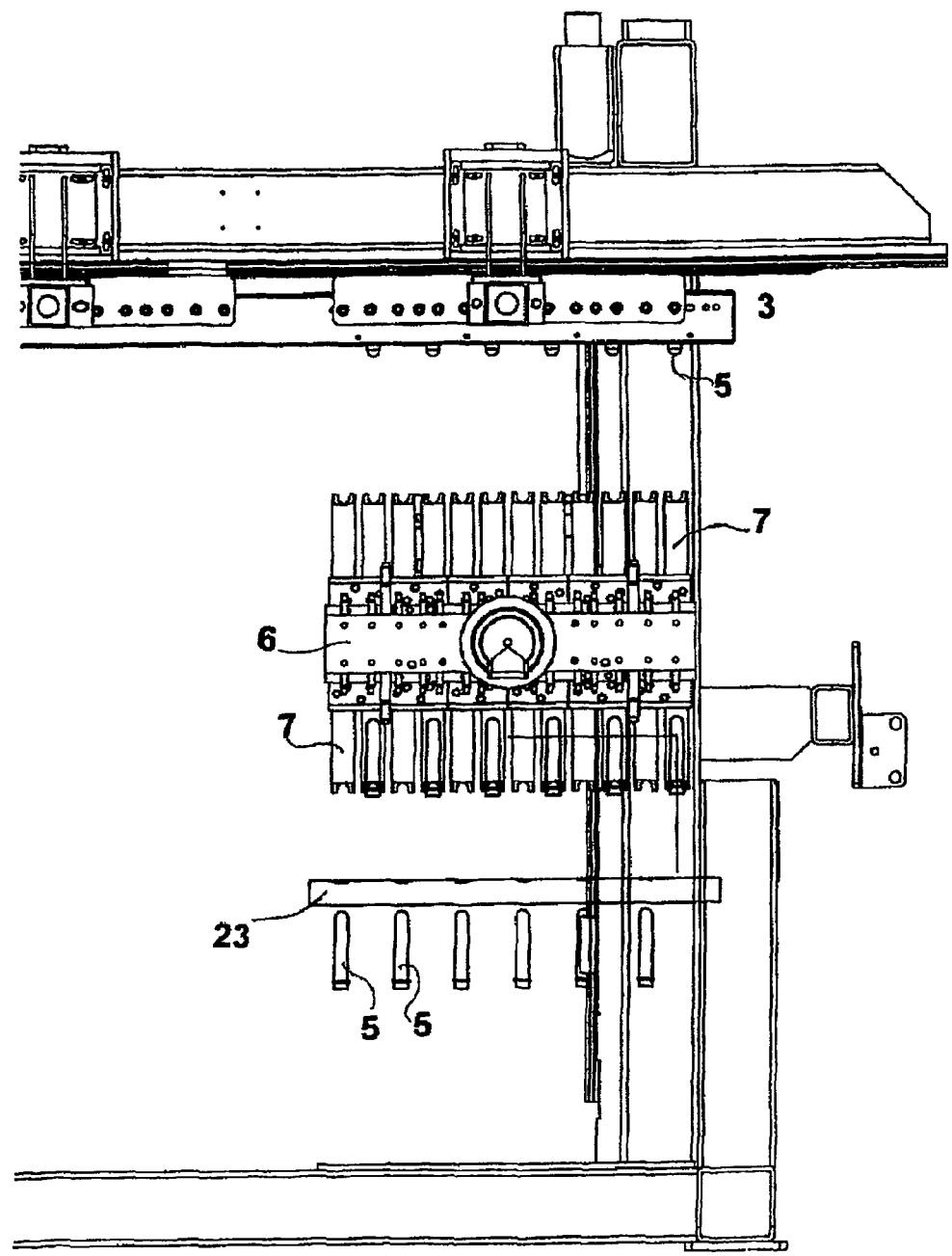
FIG. 12 shows a schematic, side view of the plant depicted in FIG. 1 during a tenth operating stage.
Figure 13:
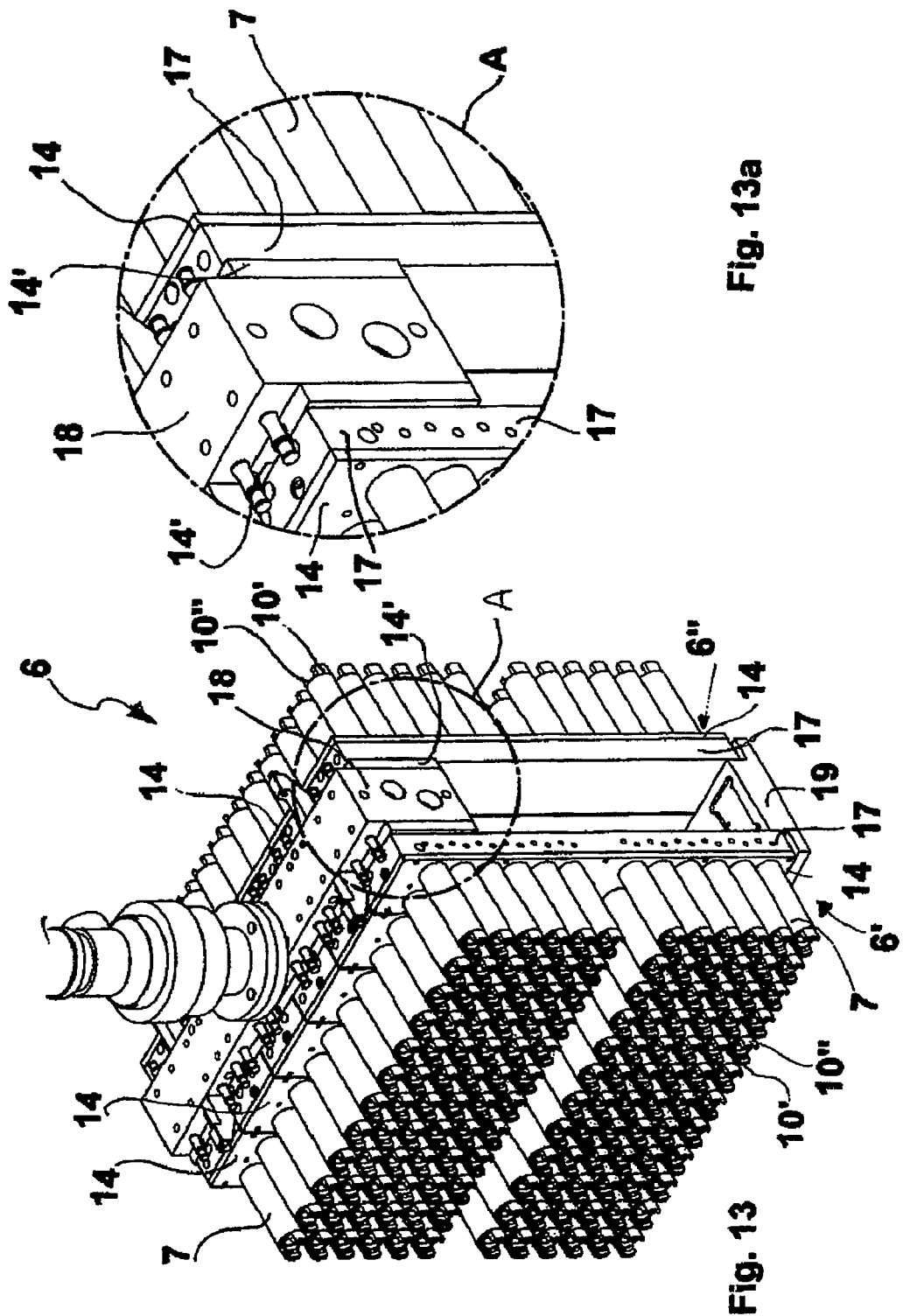
FIG. 13 shows an enlarged, axonometric view of part of the plant in accordance with this invention.

Then, as shown in FIG. 7, the turret 6 is lowered in an essentially vertical way until it is near the extracting plate 23. Obviously, the turret 6 can also move in vertical, slanting directions while remaining within the scope of this invention. It is also possible to foresee a version wherein the turret 6 moves horizontally toward the unloading means. FIG. 17 shows the positions of the preforms 5 held in the holders of the face of the turret facing downward, thanks to the appropriate positioning of the extracting plate 23. Then, the plate 23 slides by an interval necessary to align the teeth 29, 30 with the preforms to be removed see FIGS. 8 and 9, which show the insertion stage in the holders. FIGS. 10 and 11 show the insertion stage of the teeth between the ring 9 and the holders 7. FIGS. 8a, 9a, 10a, and 11a show detail views of the process. This concerns those preforms loaded first onto the rotary turret i.e. preforms cool enough to be unloaded. When the turret 6 is lifted, the teeth 29, 30 hold the preforms see FIGS. 10 and 11 that fall under gravity onto the collection means see FIG. 12 found under said turret these means are of the known type and are not shown in the figures.

Then, the turret 6 rotates by 180° so that the holders freed from the preforms are placed with the holder opening turned upward and are available to receive the next group of preforms 5. Now, the procedure continues at full speed, meaning that every basic cycle involves a rotation of the turret, a release of a group of preforms from the turret with the same distribution layout and loaded before the other groups on the turret, and loading a new group of preforms with the same distribution layout onto the turret by the arm 3.

The described solution makes it possible to contain many preforms in a very small space that is equipped for effective cooling. The total of the different layouts available on two surfaces 6', 6>> is predetermined based on the total duration of the cooling stage of the preforms 5 in the turret 6.

In an advantageous version of the invention, the vacuum between the holders of each row is eliminated by injecting low-pressure air through the channels 8 into the holders to help the extraction process; this is accomplished with known means that, consequently, shall not be described in detail herein. This facilitates and speeds up the extraction of the preforms from the holders. This version is more costly to construct than the version without the means for removing the vacuum in the holders.

This invention is suitable for optimizing the individual work cycles and increasing the overall productivity of the plant.

The invention claimed is:

1. A device for extracting plastic preforms provided with a first portion having a predetermined transversal dimension and a second adjacent portion having a transversal dimension greater than the first portion, the device comprising a supporting structure, gripping means suitable to extract the preforms from conditioning cavities, a plate fixed to the supporting structure and incorporating gripping means, which comprise a plurality of straight slits parallel to a predefined direction, wherein each slit is provided with first sections of a first predetermined width and second sections forming constrictions of a second predetermined width, wherein the second predetermined width is smaller than the transversal dimension of the second portion of the preform and greater than the dimensions of the first portion of the preform, whereby the first width is such to allow the second portion of the preforms to fit into the slit, and the second width is such not to allow the second portion of the preforms to fit into the slit, wherein there are provided control and operating means to make the plate move in said direction by a predefined length, whereby the preforms are hooked by the plate when portions of the plate defining the second width register against the second portions of the preforms so as to extract the preforms from the conditioning cavities by reciprocally moving away the plate from the conditioning cavities.

2. An process for extracting a plurality of plastic performs from their conditioning cavities by means of the device as claimed in claim 1 wherein there is provided a plate with straight and parallel slits having first wider sections and second sections with tooth-shaped constrictions, wherein, when the plastic preforms reach a predefined consistency the process comprises the following steps:

a) nearing the conditioning cavities containing the plastic preforms to the extracting device, b) inserting the preforms into the slits by making the second wider portion of the preforms enter the wider sections of the slits, c) translating the plate by a predetermined length in the direction until the wider portion of the plastic preforms comes into contact with the tooth-shaped constrictions which fit into a space between the second portion and the first portion of the preforms, so as to hook the preforms into the plate, d) moving away the plate from the conditioning cavities to extract the preforms from the conditioning cavities.

3. A device as claimed in claim 1, wherein the conditioning cavities are arranged side by side and in regular, parallel rows on a surface of a mobile element.

4. A device as claimed in claim 3, wherein, in correspondence of the constrictions, the plate has a thickness smaller than the distance between the ring and the outer edge of the conditioning cavities, whereby a space is defined, in order to be able to fit into said space when moved in said direction.

5. A device as claimed in claim 4, wherein the mobile element is a turret pivotable around a horizontal axis, parallel to the plane of said plate.

6. A device as claimed in claim 5 comprising a safety system for adjusting an end-stop of the turret.

7. A device as claimed in claim 6 comprising a system for adjusting the height of the plate from ground level.

8. A device as claimed in claim 5, wherein the slits are of the through type, passing through the thickness of the plate, whereby the preforms that are extracted from the conditioning cavities of the turret can fall through the plate.

9. A device as claimed in claim 8 comprising motor means suitable to move the plane of the plate in a substantially direction orthogonal to the plane itself for extracting the preforms.

* * * * *